US 6,279,551 B1

(12) United States Patent
Iwano et al.

(10) Patent No.: US 6,279,551 B1
(45) Date of Patent: Aug. 28, 2001

(54) APPARATUS FOR CONTROLLING INTERNAL COMBUSTION ENGINE WITH SUPERCHARGING DEVICE

(75) Inventors: Hiroshi Iwano, Kanagawa; Hiraku Ooba, Yokohama; Isamu Kazama, Kanagawa; Toru Fuse, Yokohama, all of (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/541,927

(22) Filed: Apr. 3, 2000

(30) Foreign Application Priority Data

Apr. 5, 1999 (JP) ................................................ 11-097349

(51) Int. Cl.$^7$ ...................................................... F02B 33/00
(52) U.S. Cl. ............................ 123/564; 60/605.2; 60/611
(58) Field of Search ............................. 123/564; 60/600, 60/605.2, 611

(56) References Cited

U.S. PATENT DOCUMENTS 5,307,783 * 5/1994 Satoya et al. .................... 123/564 X
5,454,360 * 10/1995 Shimizu et al. ...................... 123/564
5,613,478 * 3/1997 Widmann ............................ 123/564

* cited by examiner

Primary Examiner—Hoang Nguyen
(74) Attorney, Agent, or Firm—Foley & Lardner

(57) ABSTRACT

An electronic engine control system of an internal combustion engine with a supercharging device operable to produce a desired boost pressure, includes an electronically-controlled throttle valve and a pressure sensor located in an induction system to detect an actual boost pressure. The system computes a target air quantity used in a stratified combustion mode or in a homogeneous lean combustion mode, based on at least an operated amount of an accelerator, and computes the desired boost pressure based on engine speed and engine load, and computes a boost-pressure correction factor as the ratio of the desired boost pressure to the actual boost pressure, during the stratified combustion mode or during the homogeneous lean combustion mode. An arithmetic-calculation section is also provided to compensate for the target air quantity by the boost-pressure correction factor during the stratified combustion mode or during the homogeneous lean combustion mode. The compensated target air quantity is determined as a virtual target air quantity. A throttle actuator device drives the electronically-controlled throttle, so that the virtual target air quantity is drawn into the engine, thus compensating for the response delay in boost-pressure change during acceleration/deceleration in the lean or ultra-lean combustion mode.

21 Claims, 20 Drawing Sheets

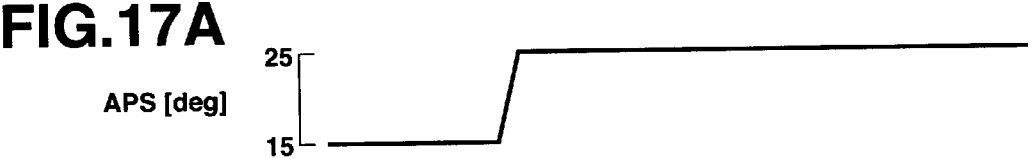
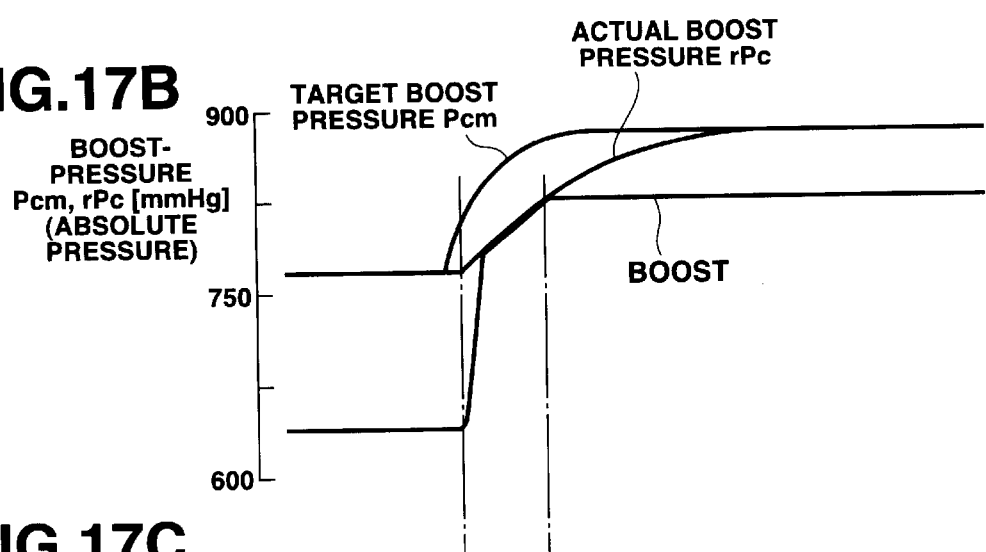
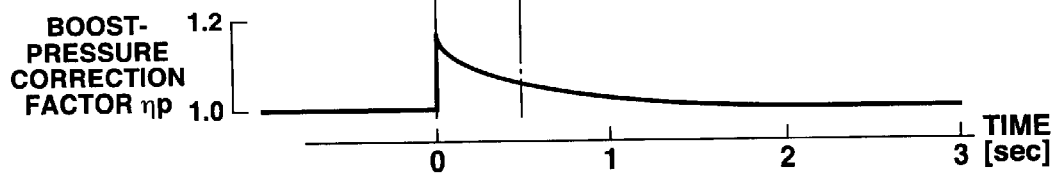

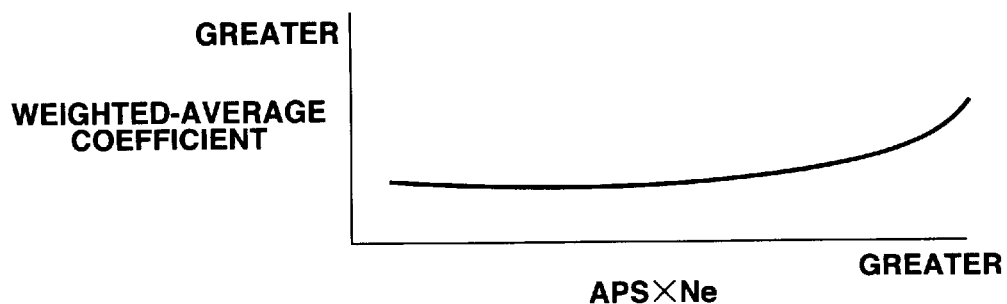
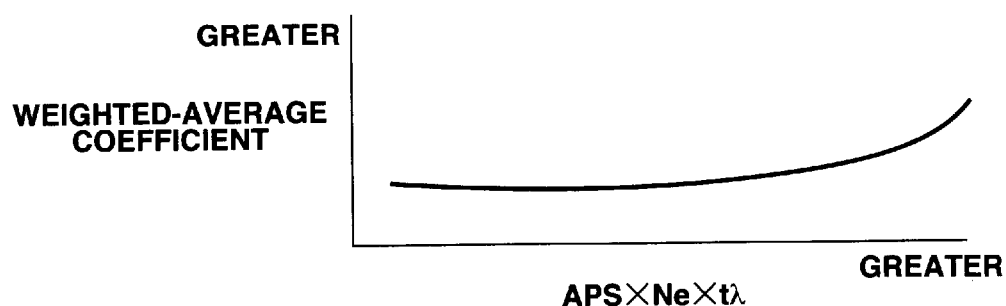
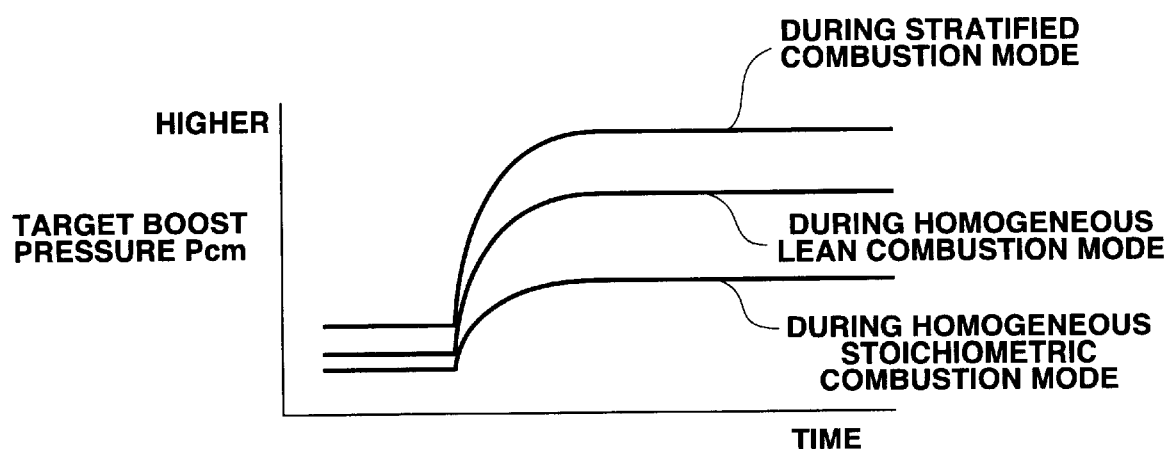

APPARATUS FOR CONTROLLING INTERNAL COMBUSTION ENGINE WITH SUPERCHARGING DEVICE

BACKGROUND OF THE INVENTION

1. Field of the Invention

The present invention relates to an apparatus for controlling an internal combustion engine with a supercharging device, such as a supercharger or a turbosupercharger (simply, a turbocharger), and particularly to an electronically-controlled internal combustion engine with a supercharging device and an electronic fuel-injection system used to switch between at least a homogeneous combustion mode and a stratified combustion mode.

2. Description of the Prior Art

In recent years, there have been proposed and developed various internal combustion engines capable of operating at either one of at least two combustion modes, namely a homogeneous combustion mode where fuel-injection early in the intake stroke produces a homogeneous air-fuel mixture and a stratified combustion mode (a late injection combustion mode) where late fuel-injection delays the event until the end of the compression stroke to produce a stratified air-fuel mixture. When accelerating in an engine operating region of a lean or ultra-lean air/fuel mixture ratio leaner than a stoichiometric air/fuel mixture ratio (14.6:1), that is, during acceleration in a lean-burn mode or in a ultra-lean-burn mode), there are two ways to increase the engine power output. One way is to control or manage the air/fuel mixture ratio (A/F or AFR) toward a richer air/fuel ratio. In this case, there is a problem of increased nitrogen oxides (NOx) emissions. Another method is to increase the pressure on the air-fuel mixture by way of the supercharging device, without changing the A/F. According to the latter method, it is possible to increase the engine power output while reducing NOx emissions, when accelerating in the lean-burn mode or in the ultra-lean-burn mode. One such method has been disclosed in Japanese Patent Provisional Publication No. 7-158462.

SUMMARY OF THE INVENTION

Boost-pressure change characteristics obtained during an accelerating condition in an engine operating region at a stoichiometric air/fuel ratio, (which region will be hereinafter referred to as a "stoichiometric combustion mode" or a "stoichiometric combustion zone"), are somewhat different from those obtained during an accelerating condition in an engine operating region at a lean air/fuel ratio (which region will be hereinafter referred to as a "lean combustion mode" or a "lean combustion zone"). In comparison with the accelerating/decelerating condition in the stoichiometric combustion mode, there is a great boost-pressure change during accelerating/decelerating condition in the lean combustion mode. For example, during the accelerating condition in the lean combustion mode, there is a response delay in a boost-pressure rise. The response delay in boost-pressure rise results in a delay in an increase in a quantity of air entering engine cylinders. Similarly, during the decelerating condition in the lean combustion mode, there is a response delay in a boost-pressure drop. The response delay in boost-pressure drop results in a delay in a decrease in intake-air quantity. Due to the response delay in boost-pressure change, engine torque rise/fall characteristics given during acceleration/deceleration in the lean combustion mode are different from those given during acceleration/deceleration in the stoichiometric combustion mode. As set out above, in the presence of the response delay in boost-pressure change, the lean combustion mode is inferior to the stoichiometric combustion mode, in engine torque rise/fall characteristics and driveability.

Accordingly, it is an object of the invention to provide an apparatus for controlling an internal combustion engine with a supercharging device, which avoids the aforementioned disadvantages of the prior art.

It is another object of the invention to provide an apparatus for controlling an internal combustion engine with a supercharging device and an electronic fuel-injection system, which is capable of providing engine torque rise/fall characteristics substantially equivalent to an accelerating/decelerating condition in a stoichiometric combustion mode, even during an accelerating/decelerating condition in a lean combustion mode.

In order to accomplish the aforementioned and other objects of the present invention, an apparatus for controlling an internal combustion engine with a supercharging device operable to produce a desired boost pressure comprises a throttle control device which controls a throttle valve, a pressure sensor located in an induction system to detect an actual boost pressure, a control unit being configured to be connected to the throttle control device for arbitrarily controlling a throttle opening of the throttle valve depending on an operated amount of an accelerator, the control unit comprising an arithmetic-calculation section which calculates a target air quantity used in an engine operating region of a lean air/fuel ratio, based on at least the operated amount of the accelerator, an arithmetic-calculation section which calculates the desired boost pressure based on engine speed and engine load, an arithmetic-calculation section which calculates a boost-pressure correction factor responsively to a difference between the desired boost pressure and the actual boost pressure, in the engine operating region of the lean air/fuel ratio, and an arithmetic-calculation section which compensates for the target air quantity used in the engine operating region of the lean air/fuel ratio by the boost-pressure correction factor to generate a compensated target air quantity, and determines the compensated target air quantity as a virtual target air quantity, and a throttle actuator device which drives the throttle valve, so that the virtual target air quantity is drawn into the engine.

According to another aspect of the invention, an apparatus for controlling an internal combustion engine with a supercharging device operable to produce a desired boost pressure comprises a throttle control device which controls a throttle valve, a pressure sensor located in an induction system to detect an actual boost pressure, a control unit being configured to be connected to the throttle control device for arbitrarily controlling a throttle opening of the throttle valve depending on an operated amount of an accelerator, the control unit comprising an arithmetic-calculation section which calculates a target air quantity based on at least the operated amount of the accelerator, an arithmetic-calculation section which calculates the desired boost pressure based on engine speed and engine load, an arithmetic-calculation section which calculates a boost-pressure correction factor responsively to a difference between the desired boost pressure and the actual boost pressure, and a determination section which determines whether the engine is in an operating region of a lean air/fuel ratio or in an operating region of a stoichiometric air/fuel ratio, and an arithmetic-and-logic section which is responsive to a result determined by the determination section, for compensating for the target air quantity by the boost-pressure correction factor to generate a compensated target air quantity and determining the compensated target air quantity as a virtual target air quantity when the engine is in the operating region of the lean air/fuel ratio, and for determining the target air quantity itself as the virtual target air quantity when the engine is in the operating region of the stoichiometric air/fuel ratio, and a throttle actuator device which drives the throttle valve, so that the virtual target air quantity is drawn into the engine.

According to a further aspect of the invention, in a computed-controlled internal combustion engine with a supercharging device operable to produce a desired boost pressure, an electronic engine control system for compensating for a response delay in boost-pressure change comprises a throttle control means for controlling a throttle valve, a pressure sensing means located in an induction system for detecting an actual boost pressure, a control unit being configured to be electronically connected to the throttle control means for arbitrarily controlling a throttle opening of the throttle valve depending on an operated amount of an accelerator, the control unit comprising an arithmetic-calculation means for calculating a target air quantity used in an engine operating region of a lean air/fuel ratio, based on at least the operated amount of the accelerator, an arithmetic-calculation means for calculating the desired boost pressure based on engine speed and engine load, an arithmetic-calculation means for calculating a boost-pressure correction factor responsively to a difference between the desired boost pressure and the actual boost pressure, in the engine operating region of the lean air/fuel ratio, and an arithmetic-calculation means for compensating for the target air quantity used in the engine operating region of the lean air/fuel ratio by the boost-pressure correction factor to generate a compensated target air quantity, and for determining the compensated target air quantity as a virtual target air quantity, and a throttle actuating means for driving the throttle valve, so that the virtual target air quantity is drawn into the engine.

According to a still further aspect of the invention, in a computed-controlled internal combustion engine with a supercharging device operable to produce a desired boost pressure, an electronic engine control system for compensating for a response delay in boost-pressure change comprises a throttle control means for controlling a throttle valve, a pressure sensing means located in an induction system for detecting an actual boost pressure, a control unit being configured to be connected to the throttle controlling means for arbitrarily controlling a throttle opening of the throttle valve depending on an operated amount of an accelerator, the control unit comprising an arithmetic-calculation means for calculating a target air quantity based on at least the operated amount of the accelerator, an arithmetic-calculation means for calculating the desired boost pressure based on engine speed and engine load, an arithmetic-calculation means for calculating a boost-pressure correction factor responsively to a difference between the desired boost pressure and the actual boost pressure, and a determination means for determining whether the engine is in an operating region of a lean air/fuel ratio or in an operating region of a stoichiometric air/fuel ratio, and an arithmetic-and-logic means being responsive to a result determined by the determination section, for compensating for the target air quantity by the boost-pressure correction factor to generate a compensated target air quantity and determining the compensated target air quantity as a virtual target air quantity when the engine is in the operating region of the lean air/fuel ratio, and for determining the target air quantity itself as the virtual target air quantity when the engine is in the operating region of the stoichiometric air/fuel ratio, and a throttle actuating means for driving the throttle valve, so that the virtual target air quantity is drawn into the engine.

According to another aspect of the invention, a method for compensating for a response delay in boost-pressure change in a computed-controlled internal combustion engine having a supercharging device operable to produce a desired boost pressure and a throttle valve whose throttle opening is arbitrarily controlled depending on an operated amount of an accelerator, the method comprising detecting an actual boost pressure, calculating a target air quantity used in an engine operating region of a lean air/fuel ratio, based on at least the operated amount of the accelerator, calculating the desired boost pressure based on engine speed and engine load, calculating a boost-pressure correction factor as a ratio of the desired boost pressure to the actual boost pressure, in the engine operating region of the lean air/fuel ratio, compensating for the target air quantity used in the engine operating region of the lean air/fuel ratio by the boost-pressure correction factor to generate a compensated target air quantity, determining the compensated target air quantity as a virtual target air quantity, and driving the throttle valve, so that the virtual target air quantity is drawn into the engine.

According to another aspect of the invention, a method for compensating for a response delay in boost-pressure change in a computed-controlled internal combustion engine having a supercharging device operable to produce a desired boost pressure and a throttle valve whose throttle opening is arbitrarily controlled depending on an operated amount of an accelerator, the method comprising detecting an actual boost pressure, calculating a target air quantity based on at least the operated amount of the accelerator, calculating the desired boost pressure based on engine speed and engine load, calculating a boost-pressure correction factor as a ratio of the desired boost pressure to the actual boost pressure, determining whether the engine is in an operating region of a lean air/fuel ratio or in an operating region of a stoichiometric air/fuel ratio, compensating for the target air quantity by the boost-pressure correction factor to generate a compensated target air quantity, determining the compensated target air quantity as a virtual target air quantity when the engine is in the operating region of the lean air/fuel ratio, and determining the target air quantity itself as the virtual target air quantity when the engine is in the operating region of the stoichiometric air/fuel ratio, and driving the throttle valve, so that the virtual target air quantity is drawn into the engine.

According to another aspect of the invention, an apparatus for controlling an internal combustion engine with a supercharging device operable to produce a desired boost pressure, comprises a throttle control device which controls an electronically-controlled throttle valve, a pressure sensor located in an induction system to detect an actual boost pressure, a control unit being configured to be electronically connected to the throttle control device for arbitrarily controlling a throttle opening of the electronically-controlled throttle valve depending on an operated amount of an accelerator, the control unit comprising an arithmetic-calculation section which calculates a target air quantity used in an engine operating region of a lean air/fuel ratio, based on at least the operated amount of the accelerator, an arithmetic-calculation section which calculates the desired boost pressure based on engine speed and engine load, an arithmetic-calculation section which calculates a boost-pressure correction factor responsively to a difference between the desired boost pressure and the actual boost pressure, in the engine operating region of the lean air/fuel ratio, and an arithmetic-calculation section which compensates for the target air quantity used in the engine operating region of the lean air/fuel ratio by the boost-pressure correction factor to generate a compensated target air quantity, and determines the compensated target air quantity as a virtual target air quantity, and a throttle actuator device which drives the electronically-controlled throttle, so that the virtual target air quantity is drawn into the engine.

BRIEF DESCRIPTION OF THE DRAWINGS

FIGS. 17A–17C are timing charts explaining the operation of the system of the embodiment, executing the virtual-target-air-quantity (tQad) arithmetic-calculation routine of FIG. 14.

FIG. 18 shows another example of a weighted-average-coefficient characteristic diagram illustrating the relationship between the product (APS×Ne) of the operated amount APS of the accelerator and the engine speed Ne, and a weighted-average coefficient (Kp1, Kp2, Kp3).

FIG. 20 shows a further example of a weighted-average-coefficient characteristic diagram illustrating the relationship between the product (APS×Ne×tλ) of the operated amount APS of the accelerator, the engine speed Ne and the target excess air factor t λ, and a weighted-average coefficient (Kp).

FIG. 22 is a timing chart explaining the operation of the system of the embodiment, executing the target-boost-pressure (Pcm) arithmetic-calculation routine of FIG. 21.

DESCRIPTION OF THE PREFERRED EMBODIMENTS

Figure 1:
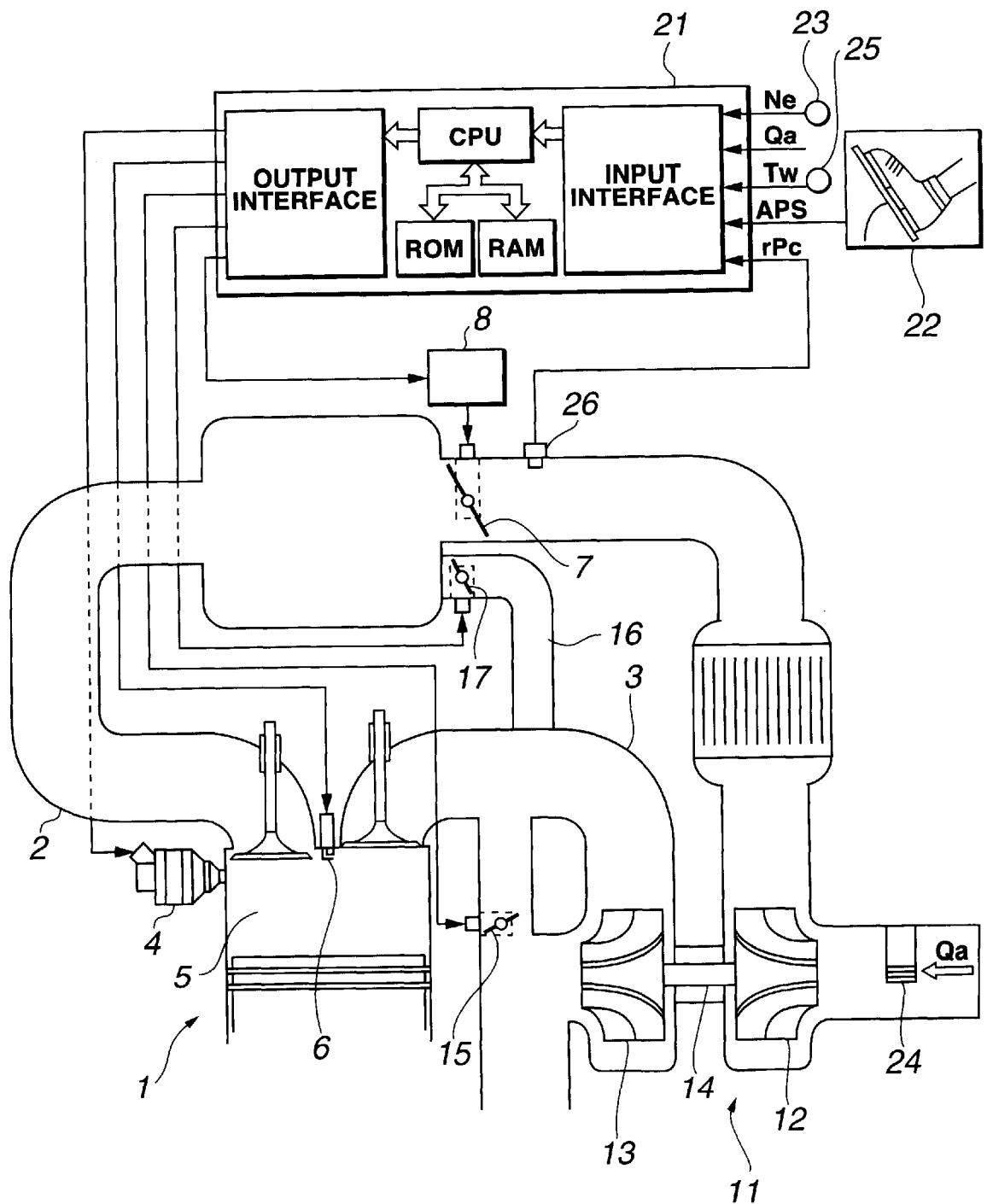
FIG. 1 is a system arrangement of one embodiment of an electronic engine control system (an electronic concentrated engine control system).

Referring now to the drawings, particularly to FIG. 1, the engine control apparatus of the invention is exemplified in an in-cylinder direct-injection spark-ignition, turbocharged engine 1 in which fuel is injected directly into the engine cylinder. Fresh air (intake air) is introduced into each engine cylinder through an intake-air duct (or an intake-air pipe or an intake-air passage) 2, an intake-air collector (not numbered), and an intake manifold (not numbered). Fuel injectors 4 are provided at each of branched portions of the intake manifold. A cylinder head of the engine 1 is formed with an intake-valve port communicating with the intake manifold and an exhaust-valve port communicating with an exhaust manifold (not numbered). A spark plug 6 is screwed into a tapped hole of the cylinder head for each combustion chamber 5 to ignite the air fuel mixture in the combustion chamber. Hot burned gases from the engine cylinders are exhausted through the exhaust valve and the exhaust manifold into an exhaust passage (or an exhaust pipe). An air-flow meter 24 is located on the intake-air passage 2 for detecting a quantity Qa of air flowing through the air-flow meter and drawn into the engine 1. A hot-wire mass air flow meter is commonly used as the air quantity sensor. Reference sign 7 denotes an electronically-controlled throttle valve unit. The electronically-controlled throttle valve unit is provided between the air-flow meter 24 and the collector, and equipped with a throttle actuator device. Reference sign 8 denotes a throttle control device is connected to the throttle actuator device to control and adjust the throttle opening of the throttle valve via the throttle actuator device in response to a command signal from an electronic control unit (ECU) or an electronic control module (ECM) 21. The throttle valve unit 7 will be hereinafter referred to simply as "a throttle valve". The engine 1 is equipped with a supercharging device 11, for introducing air for combustion into each engine cylinder at a pressure in excess that which can be obtained by natural aspiration. In the shown embodiment, a turbo-supercharger (simply called "turbocharger") is used as the supercharging device 11. The turbocharger 11 is comprised of an air compressor 12 and a turbine 13. The exhaust gas, still under some pressure as it leaves the engine cylinders, is directed into the turbine. The turbine wheel of the turbine 13 is spun by the exhaust gas. The turbine wheel is on the same shaft 14 as the compressor-pump rotor of the air compressor 12. Thus, the pump rotor is driven to produce a high manifold pressure on the air entering into the cylinders. The manifold pressure obtained by supercharging is usually called as "boost pressure". To limit boost pressure and prevent overboost, the turbocharger 11 has a wastegate valve 15. The wastegate valve 15 is provided in the inlet of the turbine 13. The wastegate valve 15 opens when boost pressure reaches a preset maximum pressure level, and then part of the exhaust gas bypasses the turbine 13 and flows through the wastegate valve 15. An exhaust-gas-recirculation (EGR) passage 16 is provided between the exhaust manifold and the intake manifold and connected to the collector downstream of the throttle valve 7, so as to recirculate part of the inert exhaust gas back into the intake manifold or the intake-air passage 2, thus lowering he formation of NOx. An exhaust-gas-recirculation (EGR) control valve 17 is disposed in the EGR passage 16, in such a manner as to control the quantity of exhaust gas recirculated. As seen in FIG. 1, the ECU 21 includes a central processing unit (CPU) that performs necessary arithmetic calculations, processes informational data, compares signals from engine/vehicle sensors to predetermined or preprogrammed threshold values, and makes necessary decisions of acceptance, and memories (RAM, ROM), an input/output interface, and often includes drivers (driver circuits) for amplification of output signals from the output interface. The electronic control unit (ECU) 21 usually comprises a microcomputer. The input interface of ECU 21 receives input information (various signals) from engine/vehicle sensors, namely an accelerator sensor (an accelerator position sensor) 22, a crank-angle sensor (a crankshaft position sensor) 23, the air-flow meter 24, an engine temperature sensor 25, and a pressure sensor 26. On the other hand, the output interface of the ECU 21 is configured to be electronically connected often through the driver circuits to electrical loads, such as fuel injector solenoids of the fuel injectors 4, the spark plugs 6, a wastegate actuator of the wastegate valve 15, an EGR valve actuator of the EGR control valve 17, and the throttle control device 8 of the electronically-controlled throttle valve 7, for generating control command signals to operate these electrical loads. The accelerator position sensor 22 is located near the accelerator for monitoring an operated amount APS of the accelerator (the accelerator opening or the degree of depression of the accelerator pedal). The crank-angle sensor 23 is provided for monitoring engine speed Ne as well as a relative position of the engine crankshaft. The air-flow meter 24 is designed to generate a voltage signal proportional to the quantity Qa of air flowing through the air-flow meter and drawn into the engine. A coolant temperature sensor is usually used as the engine temperature sensor 25. The coolant temperature sensor 25 is mounted on the engine and usually screwed into one of top coolant passages to sense the actual operating temperature of the engine (the engine coolant temperature Tw). The pressure sensor 26 is located in the intake-air passage 2 upstream of the throttle valve 7, to detect the manifold pressure (actual boost pressure) rPc. The operating parameters detected by the previously-noted sensors are used to electronically control an injection amount as well as an injection timing of each of the injectors 4 of an electronic fuel-injection system, that is, an air/fuel ratio (A/F), an ignition timing of an electronic ignition system containing the spark plugs 6, and a throttle opening of the electronically-controlled throttle valve 7 by means of the throttle control device 8. The ECU 21 also controls the EGR control valve 17 depending on engine/vehicle operating conditions, such as engine speed and load. Additionally, the ECU 21 controls the opening and closing of the wastegate valve 15 for adjustment of the actual boost pressure toward a desired boost pressure, as well as prevention of overboost. Details of the fuel-injection control performed by the ECU 21 are described hereunder.

During partial loads, or during light-load operation, and in the lean-burn or ultra-lean-burn mode of a relatively great air-fuel mixture ratio, the ECU 21 selects a stratified combustion mode where late fuel-injection delays the event until the latter half of the compression stroke to produce a stratified air-fuel mixture for part-load. During the stratified combustion mode, the incoming air mixes with the denser fuel spray due to the late injection in the latter half of the compression stroke, to create a rich mixture around the spark plug 6 for easy ignition, while the rest of the air-fuel mixture after later injection is very lean at edges of the combustion chamber 5. In contrast to the above, during high-load operation (when accelerating, or during full throttle), or in the lean-burn mode or the lean-combustion mode of a comparatively small A/F, the ECU 21 selects a homogeneous combustion mode where fuel-injection early in the intake stroke produces a homogeneous air-fuel mixture suitable for high-load conditions, such that excellent mixture formation in the homogeneous charge combustion process (uniform mixing of the fuel spray with the air charge) is promoted and thus the whole combustion chamber is filled with the homogeneous air-fuel mixture. The spark-plug 6, included in the electronic ignition system computer-controlled, is responsive to an ignition signal from the ECU 21, for igniting the air-fuel mixture to ensure the homogeneous charge combustion on the intake stroke and to ensure the stratified charge combustion in the latter half of the compression stroke. In the embodiment, the combustion modes are classified into a homogeneous combustion mode and a stratified combustion mode. If the air/fuel ratio (AFR or A/F) is taken into account, the homogeneous combustion modes are further classified into a homogeneous stoichiometric combustion mode and a homogeneous lean combustion mode. Herein, the air/fuel ratio (AFR) of the homogeneous stoichiometric combustion mode is 14.6:1 AFR. The air/fuel ratio of the homogeneous lean combustion mode is 20:1 to 30:1 AFR (preferably 15:1 to 22:1 AFR). During middle load operation, the ECU 21 selects the homogeneous lean combustion mode where fuel-injection early in the intake stroke produces a homogeneous lean air-fuel mixture suitable formiddle-loadconditions. Theair/fuel ratio of the stratified combustion mode (exactly the lean stratified combustion mode or the ultra-lean stratified combustion mode) is 25:1 to 50:1 AFR (preferably 40:1 AFR). During the stratified combustion mode (that is, during the lean stratified combustion mode or the ultra-lean stratified combustion mode), the fuel spray is injected from the injector nozzle within toward the piston bowl (cavity) in the latter half of the combustion stroke. The fuel spray, injected or sprayed out from the injector nozzle in the latter half of the compression stroke, is first trapped in the piston bowl formed in the piston crown of the engine piston, and then carried toward a pair of electrodes of the spark plug 6 by virtue of in-bowl swirl flow temporarily trapped in the piston bowl on the compression stroke, and as a consequence the ignitable rich air-fuel mixture is concentrated in the center of the compressed air-fuel mixture around the spark plug 6. When a spark is produced at the spark-plug gap in response to a controlled ignition timing, the combustion takes place largely in and around the concentration of rich mixture, and then the burning rich mixture spreads into areas where the air-fuel mixture is lean and harder to ignite. As discussed above, the lean stratified combustion or ultra-lean stratified combustion is attained.

A supercharging operation is often executed in the engine operating region of a lean A/F (that is, in the stratified combustion zone or in the homogeneous lean combustion zone). When accelerating in such a lean combustion mode, there is a response delay in boost-pressure rise. This creates a delay in the increase in the intake-air quantity of air drawn into the engine. In contrast to the above, when decelerating in the lean combustion mode, there is a response delay in a boost-pressure drop. This creates a delay in the decrease in the intake-air quantity. Owing to the response delay in boost-pressure change in the turbocharged engine, engine torque rise/fall characteristics given during acceleration/deceleration in the lean combustion mode are different from those given during acceleration/deceleration in the homogeneous stoichiometric combustion mode. To improve the engine torque rise/fall characteristics given during acceleration/deceleration in the lean combustion mode, the ECU 21 incorporated in the control apparatus of the embodiment operates to compensate for the target air quantity (tQa), and then to calculate the compensated target air quantity as a virtual target air quantity tQad. The ECU 21 controls the throttle opening of the throttle valve 7, so that the virtual target air quantity tQad is introduced into the engine. For this reason, the ECU 21 performs various data processing actions shown in FIGS. 2, 6, 7, 11, 14, 15, 19, and 21 which will be fully described later.

Figure 2:
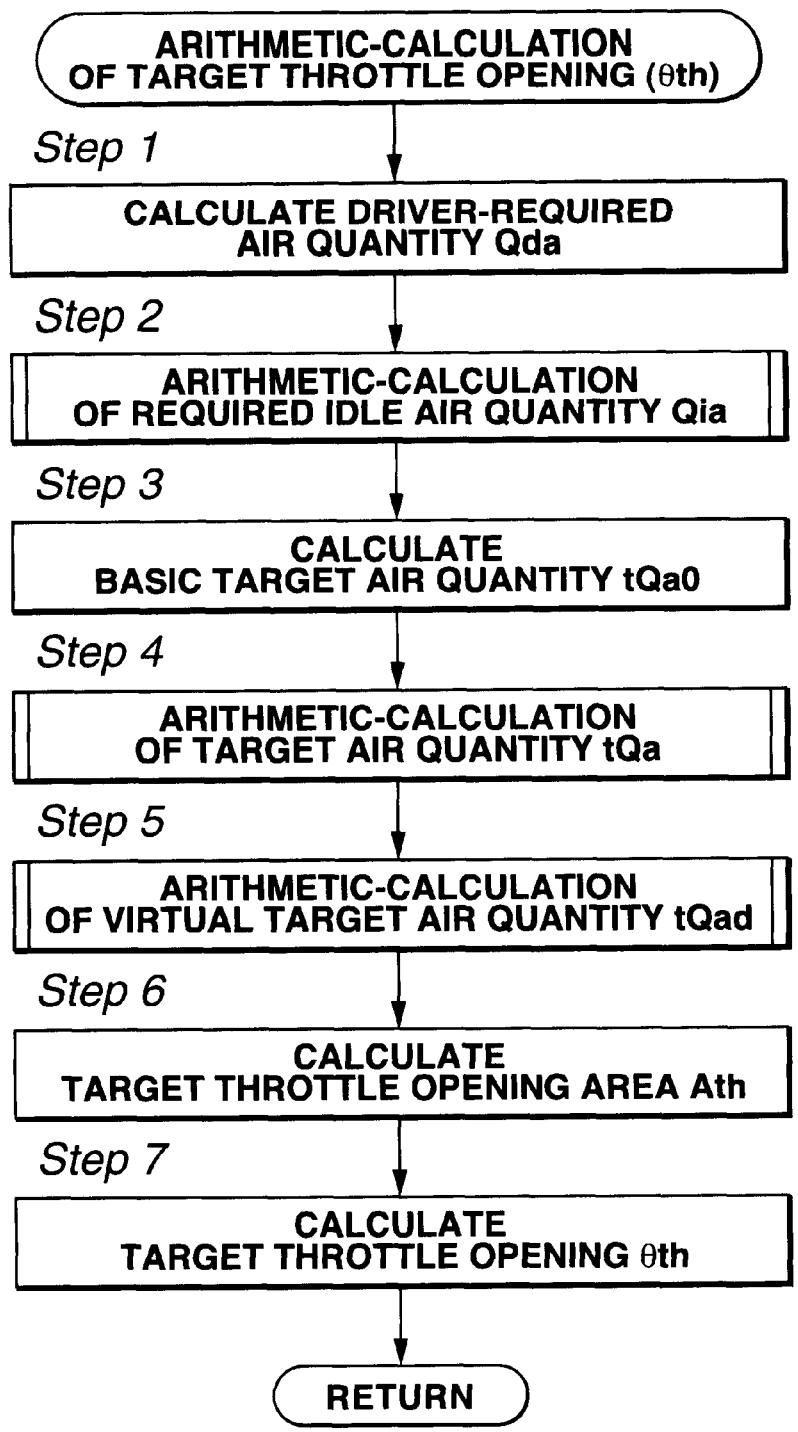
FIG. 2 is a flow chart illustrating a target-throttle-opening (θth) arithmetic-calculation routine (a main routine), executed by an electronic control unit incorporated in the system of the embodiment.

Referring now to FIG. 2, there is shown the target-throttle-opening (θth) arithmetic-calculation routine. The routine shown in FIG. 2 corresponds to a main routine executed by the engine control apparatus of the embodiment. The routine of FIG. 2 is executed as time-triggered interrupt routines to be triggered every predetermined intervals such as 10 milliseconds. On the other hand, arithmetic-calculation routines shown in FIGS. 6, 7 and 11, respectively related to steps 2, 4, and 5 of the main routine of FIG. 2, are designed as sub-routines.

Figure 3:
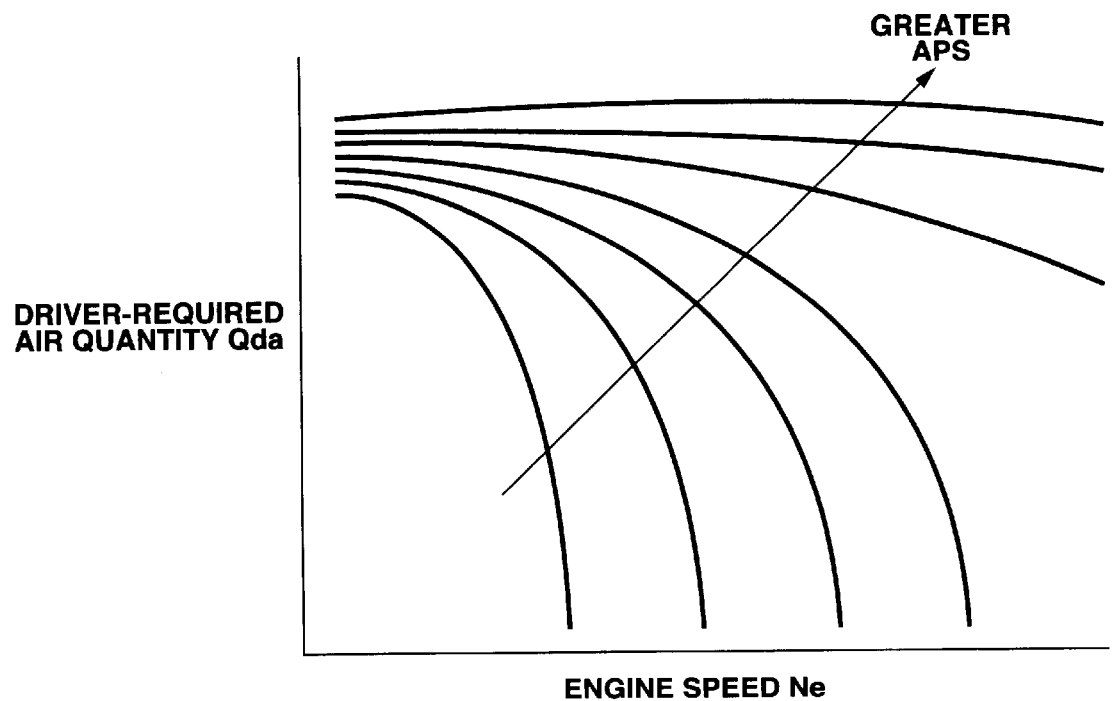
FIG. 3 is a characteristic map showing the relationship among engine speed Ne, a driver-required air quantity Qda, and an operated amount APS of an accelerator.

At step 1 of FIG. 2, the operated amount APS of the accelerator is read. The operated amount APS can be regarded as a value equivalent to engine load. So, a driver-required torque, that is, a driver-required air quantity Qda is arithmetically calculated on the basis of at least the accelerator operated amount APS. Actually, in the control apparatus of the embodiment, the driver-required air quantity Qda is map-retrieved from a predetermined or preprogrammed characteristic map of FIG. 3 showing how the driver-required air quantity Qda varies relative to both engine speed Ne and an accelerator operated amount APS. Alternatively, a vehicle's required driving torque is computed on the basis of both an accelerator operated amount APS and vehicle speed data VSS from a vehicle speed sensor. The vehicle speed sensor is usually located at either the transmission or transaxle (on front-wheel drive vehicles) for monitoring the output shaft speed to the road wheels. The output shaft speed is relayed a pulsing voltage signal to the input interface of the ECU 21 and converted into the vehicle speed data VSS. Then, the vehicle's required driving torque, based on the accelerator operated amount APS and the vehicle speed data VSS, may be converted into a driver-required torque (a driver-required air quantity Qda), accounting for a transmission ratio (a gear ratio) of the power train.

At step 2, a required idle air quantity Qia is arithmetically calculated. The required idle air quantity Qia corresponds to a required air quantity (an idle-stabilization air quantity) needed to hold a stable engine idling operation. The arithmetic processing for the required idle air quantity Qia is performed in accordance with the sub-routine shown in FIG. 6.

Figure 6:
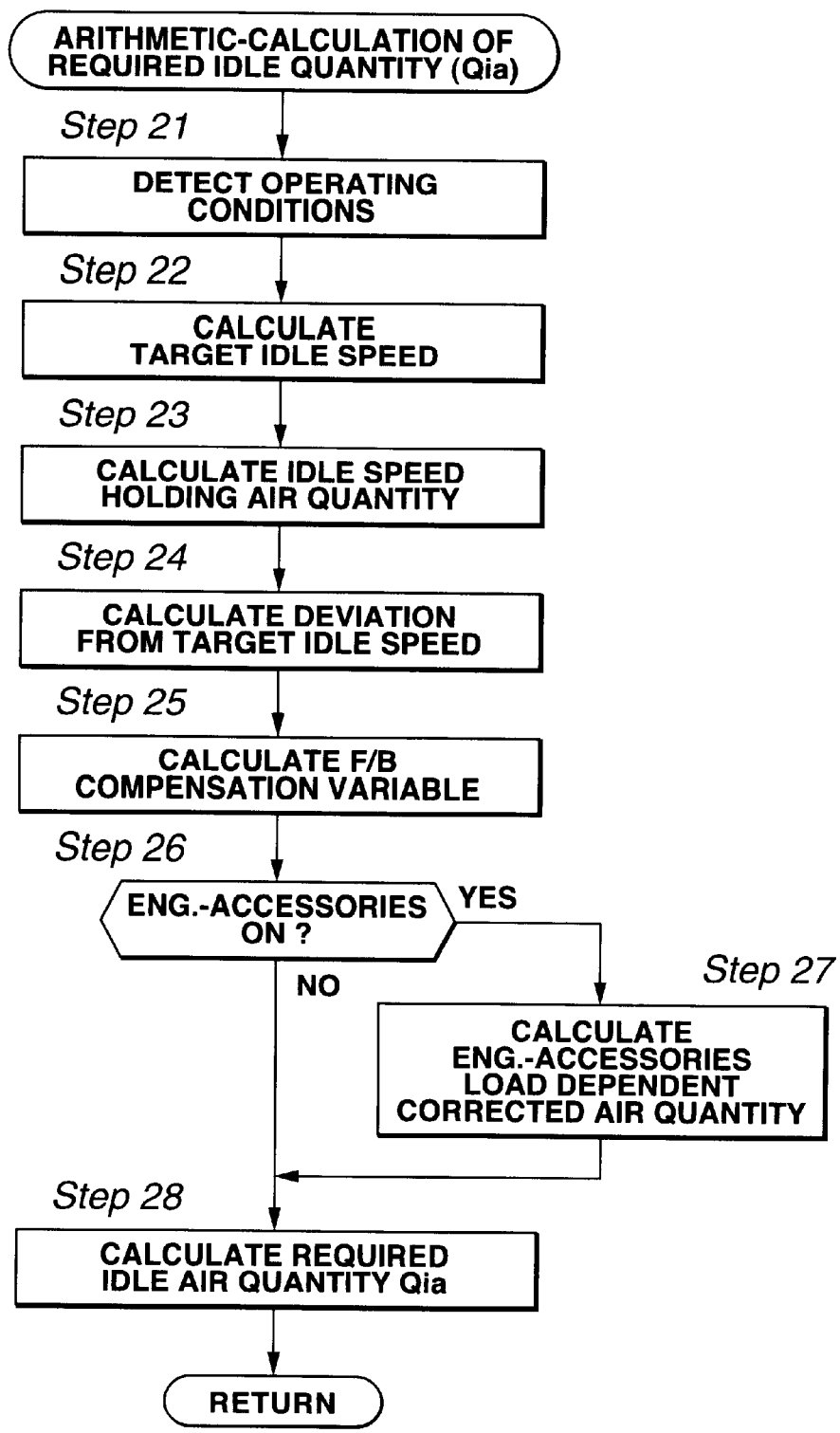
FIG. 6 is a flow chart illustrating a required idle air quantity (Qia) arithmetic-calculation routine (a sub-routine related to step 2 of FIG. 2).

At step 21 of FIG. 6, the engine operating conditions, that is, the input informational data from the previously-noted engine/vehicle sensors are read. At step 22, a target idle speed needed during an engine idling operation Is calculated on the basis of the input information indicative of the operating conditions. At step 23, an idle-speed holding air quantity needed to hold the target idle speed calculated through step 22, is calculated. In the apparatus of the embodiment, the idle-speed holding air quantity is map-retrieved from a predetermined or preprogrammed characteristic map showing how the idle-speed holding air quantity varies relative to both the target idle speed and the engine coolant temperature Tw. At step 24, a deviation of an actual idle speed from the target idle speed is calculated. At step 25, a feedback compensation variable (a feedback control signal value) for idle speed is arithmetically calculated on the basis of the deviation from the target idle speed, from a predetermined expression for PID control (proportional-plus-integral-plus-derivative control). As can be appreciated from the above, in the system of the embodiment, proportional-plusintegral-plus-derivative (PID) control in which the control signal from the ECU 21 is a linear combination of the error signal, its integral and its derivative, is used as the feedback control for the idle speed. At step 26, a check is made to determine whether engine-accessories loads, such as air conditioner load, power steering load and various electrical loads, are switched ON. When the answer to step 26 is affirmative (YES), that is, when at least one of the engine-accessories loads is in its operative state, the routine proceeds to step 27. At step 27, the processor of ECU 21 determines an engine-accessories load dependent corrected air quantity responsively to the engine-accessories loads being in their operative states. At step 28, a sum of the idle-speed holding air quantity calculated at step 23, the feedback compensation variable calculated at step 25, and the engine-accessories load dependent corrected air quantity calculated at step 27 is computed. Then, the sum is set as the required idle air quantity Qia. On the other hand, when the answer to step 26 is negative (NO), that is, when all of the engine-accessories loads are in their inoperative states, the routine flows to step 28. In such a case, at step 28, a sum of the idle-speed holding air quantity calculated at step 23 and the feedback compensation variable calculated at step 25 is computed, and thereafter the sum is set as the required idle air quantity Qia. After the required idle air quantity Qia has been calculated according to the sub-routine shown in FIG. 6, the procedure advances to step 3 of the main routine shown in FIG. 2.

At step 3 of FIG. 2, a basic target air quantity tQaO is arithmetically calculated by adding the driver-required air quantity Qda to the required idle air quantity Qia. The basic target air quantity tQaO (the sum Qda+Qia) means a target air quantity used in the stoichiometric combustion mode.

Figure 7:
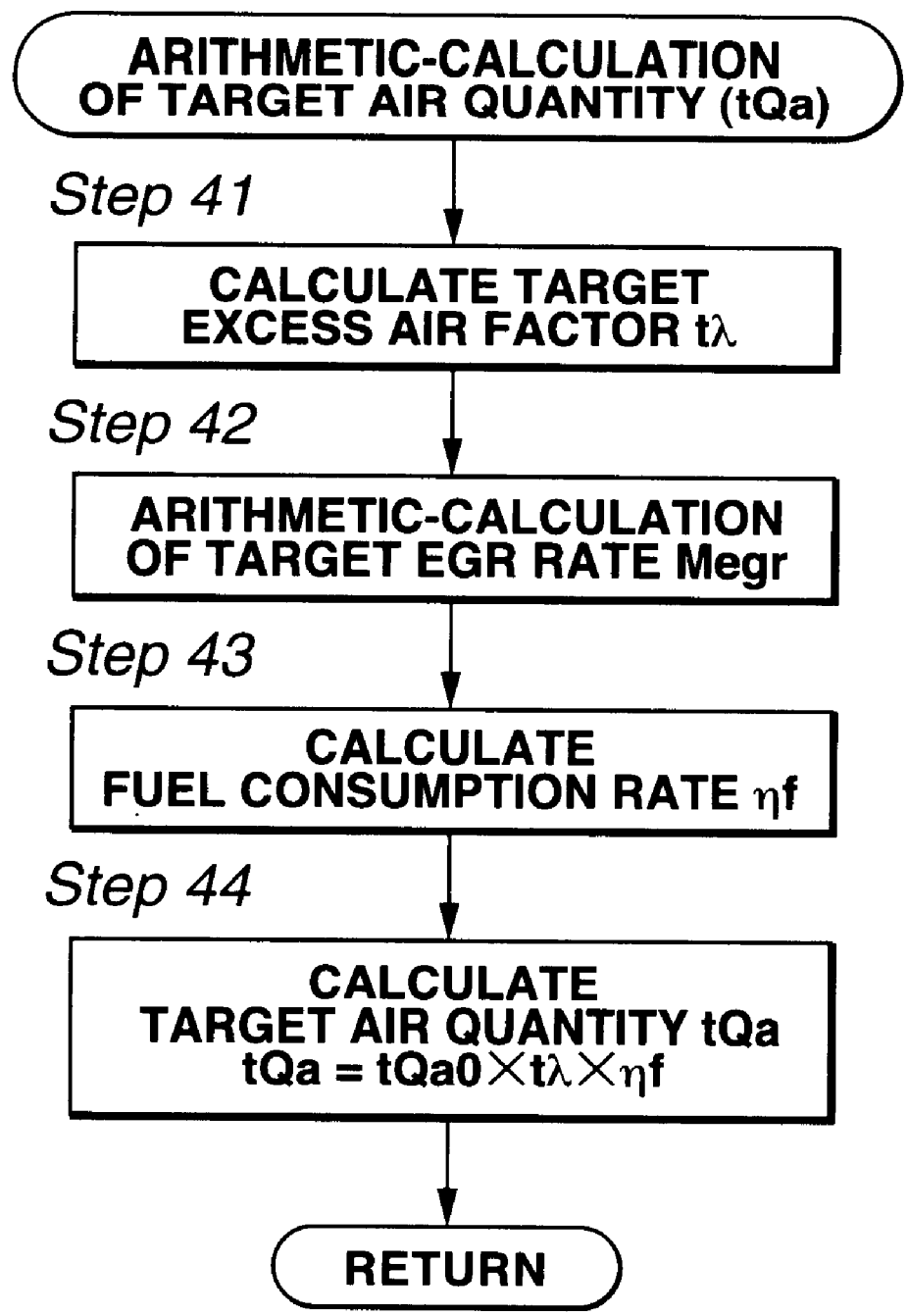
FIG. 7 is a flow chart illustrating a target air quantity (tQa) arithmetic-calculation routine (a sub-routine related to step 4 of FIG. 2).

At step 4 of FIG. 2, a target air quantity tQa is arithmetically calculated on the basis of all of the basic target air quantity tQaO, a target excess air factor t λ and a fuel consumption rate ηf, in accordance with the sub-routine shown in FIG. 7. As described later in reference to the flow chart shown in FIG. 7, the target air quantity tQa is obtained by compensating for the basic target air quantity tQaO by the product (tλ×ηf) of the target excess air factor tλ and the fuel consumption rate ηf.

Figure 8:
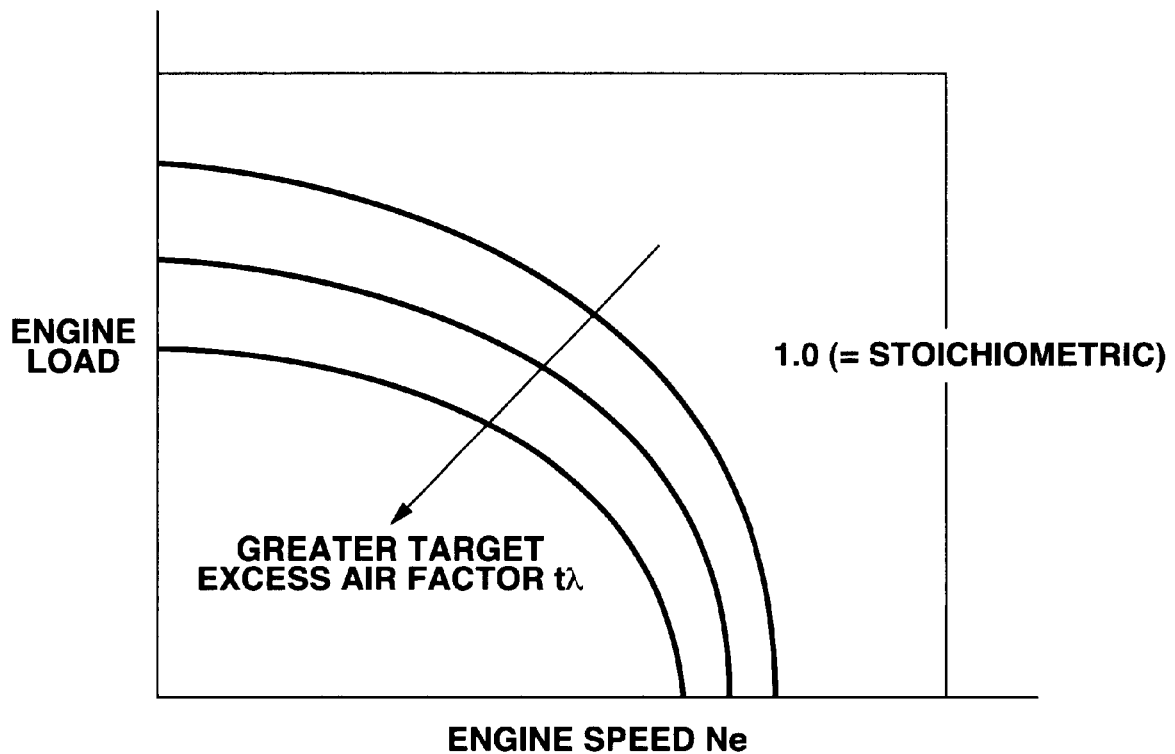
FIG. 8 is a characteristic map showing the relationship among engine speed Ne, engine load, and a target excess air factor tλ.

At step 41 of FIG. 7, the target excess air factor tλ (generally, the Greek letter lambda, λ, is used as the symbol for an excess air factor) is arithmetically calculated on the basis of the engine operating conditions, that is, the input information data from the engine/vehicle sensors. In the control apparatus of the embodiment, the target excess air factor tλ is map-retrieved on the basis of both engine speed Ne and engine load (estimated by the accelerator operated amount APS), from a predetermined or preprogrammed characteristic map shown in FIG. 8. More precisely, the target excess air factor tλ is determined depending on whether the engine 1 is in the homogeneous stoichiometric combustion mode (the homogeneous stoichiometric combustion zone), in the homogeneous lean combustion mode (the homogeneous lean combustion zone), or in the stratified combustion mode (the stratified combustion zone). In the homogeneous stoichiometric combustion zone, the target excess air factor tλ is "1.0". As appreciated from the characteristic map shown in FIG. 8, the target excess air factor tλ is designed to gradually increase, as the combustion mode shifts from the homogeneous stoichiometric combustion zone through the homogeneous lean combustion zone and the lean stratified combustion zone to the ultra-lean stratified combustion zone. As is well known, in the electronic fuel-injection system, the amount of fuel delivered to the engine cylinders is controlled by the pulse-width time, which is the actual time duration that the injector 4 remains open. During sequential fuel-injection, a fuel-injection pulse width TI is arithmetically calculated on the basis of the target excess air factor tλ, from the following expression.

$$TI=TP \times (1/t\lambda) \times 2 + TS$$

where TP denotes a basic fuel-injection pulse width, t λ denotes the target excess air factor, and TS denotes a wasted fuel-injection pulse width. During the sequential injection, the ECU outputs a command signal indicative of the fuel-injection pulse width TI to the injector 4, such that fuel is injected or sprayed from each injector nozzle once for each two revolutions of the engine crankshaft, in the firing order. The basic fuel-injection pulse width TP is represented by the expression TP=K·Qa/Ne, where K denotes a constant, Qa denotes a quantity of air measured by the air-flow meter 24, and Ne denotes engine speed. By the use of the basic fuel-injection pulse width TP, the injection system can provide an air-fuel mixture having an A/F substantially equal to stoichiometric (14.6:1 AFR). The wasted fuel-injectionpulsewidthTS is set as acorrectionvalue necessary to prevent the fuel-injection pulse width from decreasing owing to a fall in battery voltage.

At step 42 of FIG. 7, the target exhaust-gas-recirculation (EGR) rate Megr is computed on the basis of the engine operating conditions. Similarly to step 41, the target EGR rate Megr is map-retrieved on the basis of both engine speed Ne and engine load, from a predetermined or preprogrammed characteristic map showing how the target EGR rate Megr varies relative to both engine speed Ne and engine load. An EGR rate is commonly defined as a ratio of the quantity of exhaust gas recirculated to the sum of the quantity of fresh air drawn into the engine and the quantity of exhaust gas recirculated.

Figure 9:
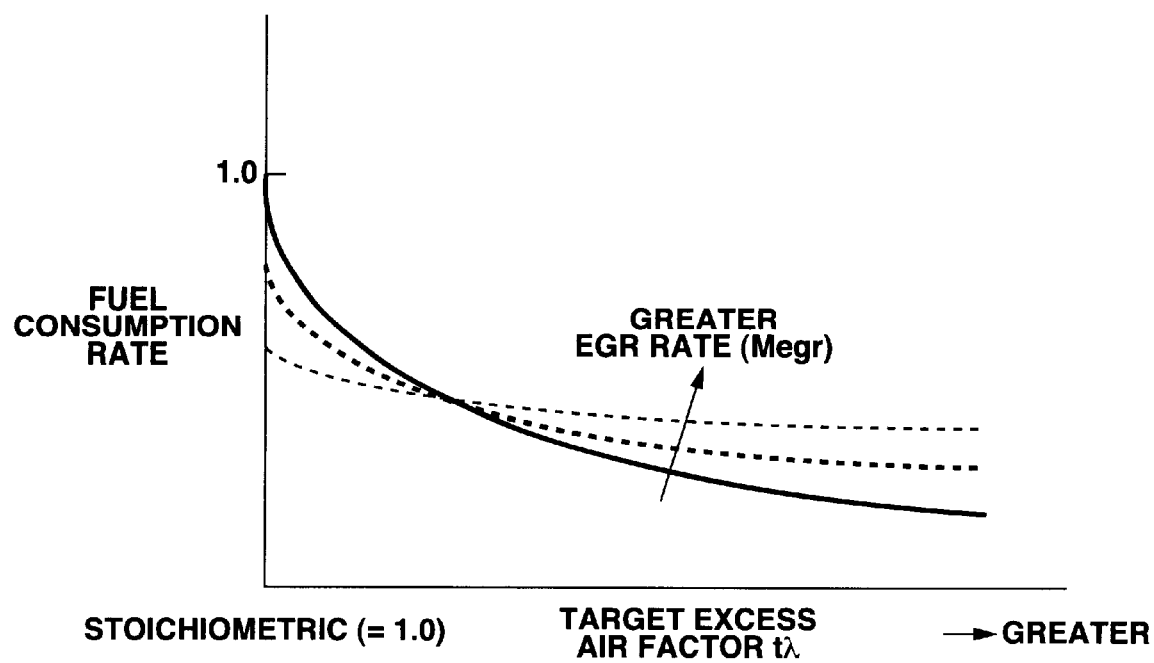
FIG. 9 is a characteristic map (real-experimentation data) showing the relationship among the target excess air factor tλ, a fuel consumption rate ηf, and an EGR rate Megr.

Subsequent to step 42 of FIG. 7, step 43 occurs. At step 43, the fuel consumption rate ηf is arithmetically calculated on the basis of both the target excess air factor tλ and the target EGR rate Megr. In the control apparatus of the embodiment, the fuel consumption rate ηf is map-retrieved from the preprogrammed map of FIG. 9 showing how the fuel consumption rate ηf varies relative to both the target excess air factor tλ and the target EGR rate Megr. The data shown in FIG. 9 is obtained by real experimentation.

At step 44 of FIG. 7, the target air quantity tQa is arithmetically calculated by compensating for the basic target air quantity tQaO with both the target excess air factor tλ (obtained through step 41) and the fuel consumption rate ηf (obtained through steps 42 and 43), from the following expression.

$$tQa = tQaO \times t\lambda \times \eta f$$

As can be appreciated from the expression, in the homogeneous stoichiometric combustion mode, the target excess air factor tλ is set at "1.0", whereas the fuel consumption rate ηf is set at the predetermined maximum rate 1.0 (see the characteristic map data of FIG. 9). In this case, the target air quantity tQa is equal to the basic target air quantity tQaO. In contrast to the above, in the homogeneous lean combustion mode or in the stratified combustion mode, the target excess air factor tλ is set at avalue greater than "1.0", whereas the fuel consumption rate ηf is set at a value less than the maximum rate "1.0". In such a lean combustion mode, the basic target air quantity tQaO is increasingly compensated for with the target excess air factor tλ greater than "1.0". On the other hand, the basic target air quantity tQaO is decreasingly compensated for with the fuel consumption rate ηf less than the maximum rate "1.0". This is because the leaner the air/fuel mixture ratio, the better the fuel consumption (the fuel consumption rate), and thus the ECU must decreasingly compensate for the target air quantity tQa to such an extent that the fuel consumption rate is improved due to a leaner A/F.

Figure 10:
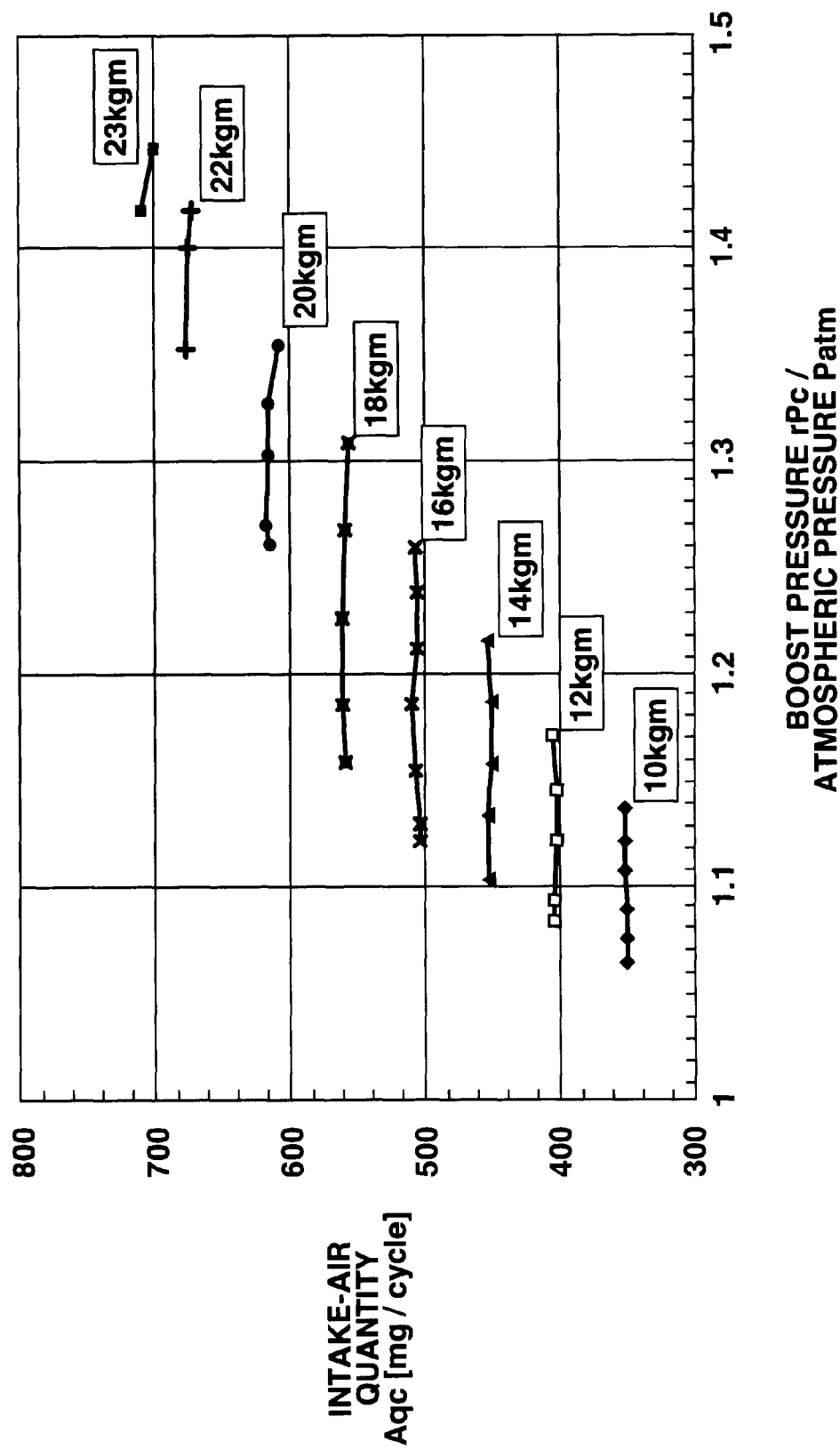
FIG. 10 shows test data showing the relationship between a ratio ($rPc/P_{atm}$) of boost pressure rPc to atmospheric pressure $P_{atm}$ and an intake-air quantity Aqc.

After the target air quantity tQa is determined as discussed above, the procedure returns from step 44 of FIG. 7 to step 5 of FIG. 2. Note that, in the control apparatus of the embodiment, by way of step 5, the target air quantity tQa is further corrected responsively to the difference between the actual boost pressure rPc and the basic boost pressure tPc, and the corrected target air quantity is determined as a virtual target air quantity tQad. Details of the arithmetic calculation for the virtual target air quantity tQad will be hereinafter described in reference to the flow chart shown in FIG. 11. Prior to discussing the sub-routine (the virtual-target-air-quantity (tQad) arithmetic-calculation routine) shown in FIG. 11, the relationship between boost pressure and intake-air quantity is first described hereunder in reference to test data shown in FIG. 10. The test data of FIG. 10 is experimentally assured by the inventors of the present invention. The test data of FIG. 10 are intake-air-quantity readings Aqc, plotted against the ratio rPc/$P_{atm}$ of boost pressure rPc to the atmospheric pressure $P_{atm}$ at each engine operating cycle (at two revolutions (720 degrees) of the crankshaft on four-stroke cycle engines) and obtained when varying only a boost pressure level measured upstream of the throttle valve 7, while holding both engine speed and engine torque at a predetermined constant value (such as 10 kgm, 12 kgm, 14 kgm, 16 kgm, 18 kgm, 20 kgm, 22 kgm, and 23 kgm in terms of engine output torque). As can be appreciated from the test data of FIG. 10, the intake-air quantity Aqc (unit: mg/cycle) is indeed proportional to the boost pressure rPc. Therefore, if there is a response delay in boost-pressure change (boost-pressure rise/fall) when accelerating or decelerating during the lean combustion mode (the homogeneous lean combustion mode and the stratified combustion mode), and then the actual boost pressure rPc is deviated from a desired equilibrium boost pressure in the lean combustion mode (in the engine operating region of a lean A/F), the control apparatus of the embodiment arithmetically calculates a virtual target air quantity tQad containing the difference between the actual boost pressure rPc and the desired equilibrium boost pressure (tPc). It is possible to provide an optimal air quantity control by controlling the throttle valve 7 so that the virtual target air quantity tQad is supplied into the engine. Concretely, when accelerating during the lean combustion mode, when the actual boost pressure rPc is below a desired equilibrium boost pressure (tPc) due to the response delay in boost pressure rise, the ECU 21 of the embodiment sets the virtual target air quantity tQad at a greater value, while taking accounting of the difference between the actual boost pressure rPc and the desired equilibrium boost pressure (tPc). Then, the ECU 21 controls the throttle control device 8, so that the opening of the electronically-controlled throttle valve 7 is adjusted toward a desired throttle opening based on the virtual target air quantity tQad set at a greater value. By virtue of the output of the command signal representative of the virtual target air quantity tQad from the input interface of the ECU 21 to the throttle control device 8, the throttle opening of the computer-controlled throttle valve 7 is set at greater value than a throttle opening based on the desired equilibrium boost pressure. This properly increasingly compensates for the intake-air quantity. As a result of this, according to the control apparatus of the embodiment, it is possible to minimize the delay in an increase in a quantity of air entering the engine, even in the presence of the response delay in boost-pressure rise, when accelerating during the lean combustion mode. Conversely, when decelerating during the lean combustion mode, when the actual boost pressure rPc is above a desired equilibrium boost pressure (tPc) due to the response delay in boost pressure fall, the ECU 21 of the embodiment sets the virtual target air quantity tQad at a smaller value, while taking accounting of the difference between the actual boost pressure rPc and the desired equilibrium boost pressure (tPc). Then, the ECU 21 controls the throttle control device 8, so that the opening of the electronically-controlled throttle valve 7 is adjusted toward a desired throttle opening based on the virtual target air quantity tQad set at a smaller value. By virtue of the output of the command signal representative of the virtual target air quantity tQad from the input interface of the ECU 21 to the throttle control device 8, the throttle opening of the computer-controlled throttle valve 7 is set at smaller value than a throttle opening based on the desired equilibrium boost pressure. This properly decreasingly compensates for the intake-air quantity. As a result of this, according to the control apparatus of the embodiment, it is possible to minimize the delay in a decrease in a quantity of air entering the engine, even in the presence of the response delay in boost-pressure fall, when decelerating during the lean combustion mode.

Figure 11:
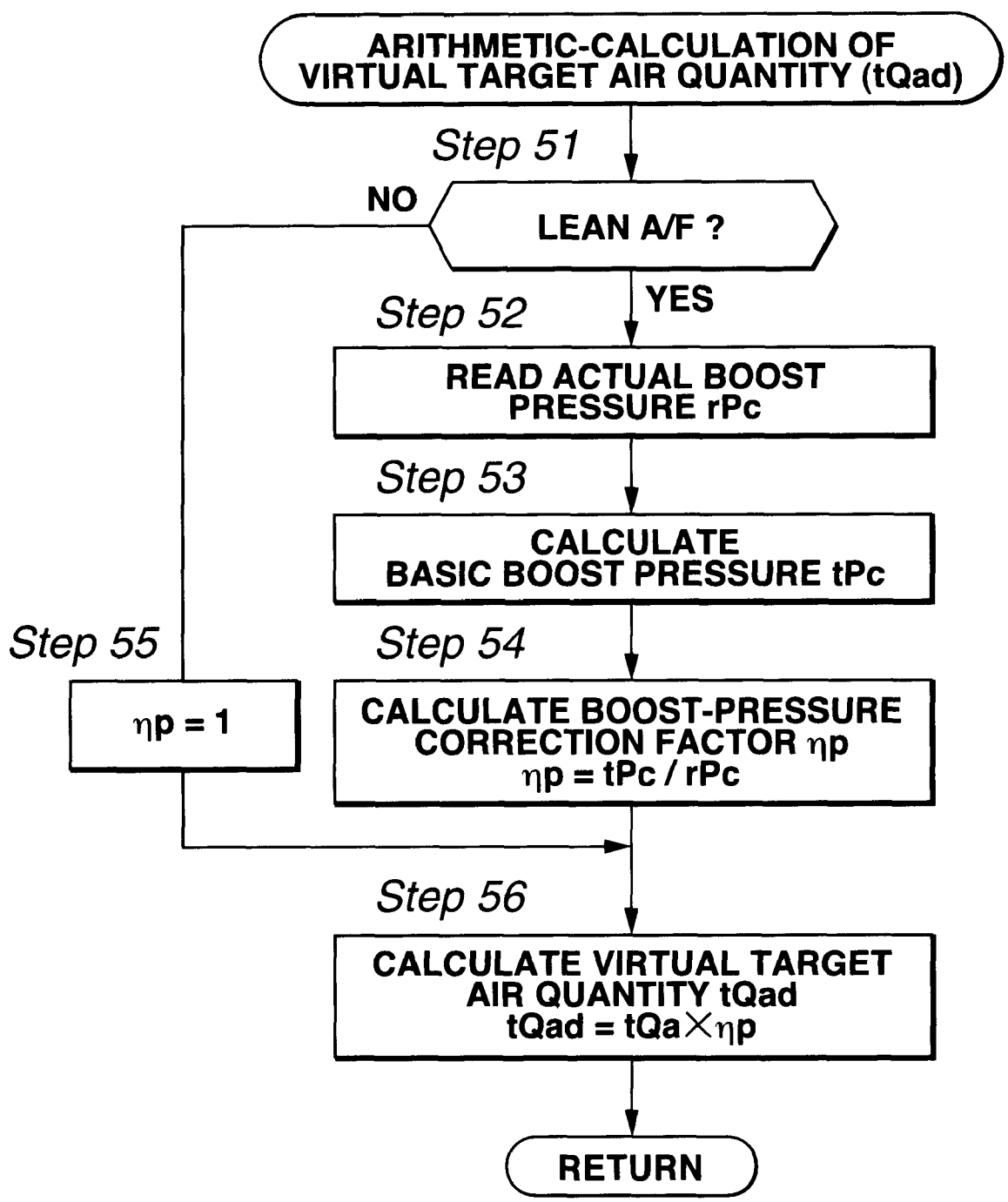
FIG. 11 shows one example of a virtual-target air-quantity (tQad) arithmetic-calculation routine related to step 5 of FIG. 2.
Figure 12:
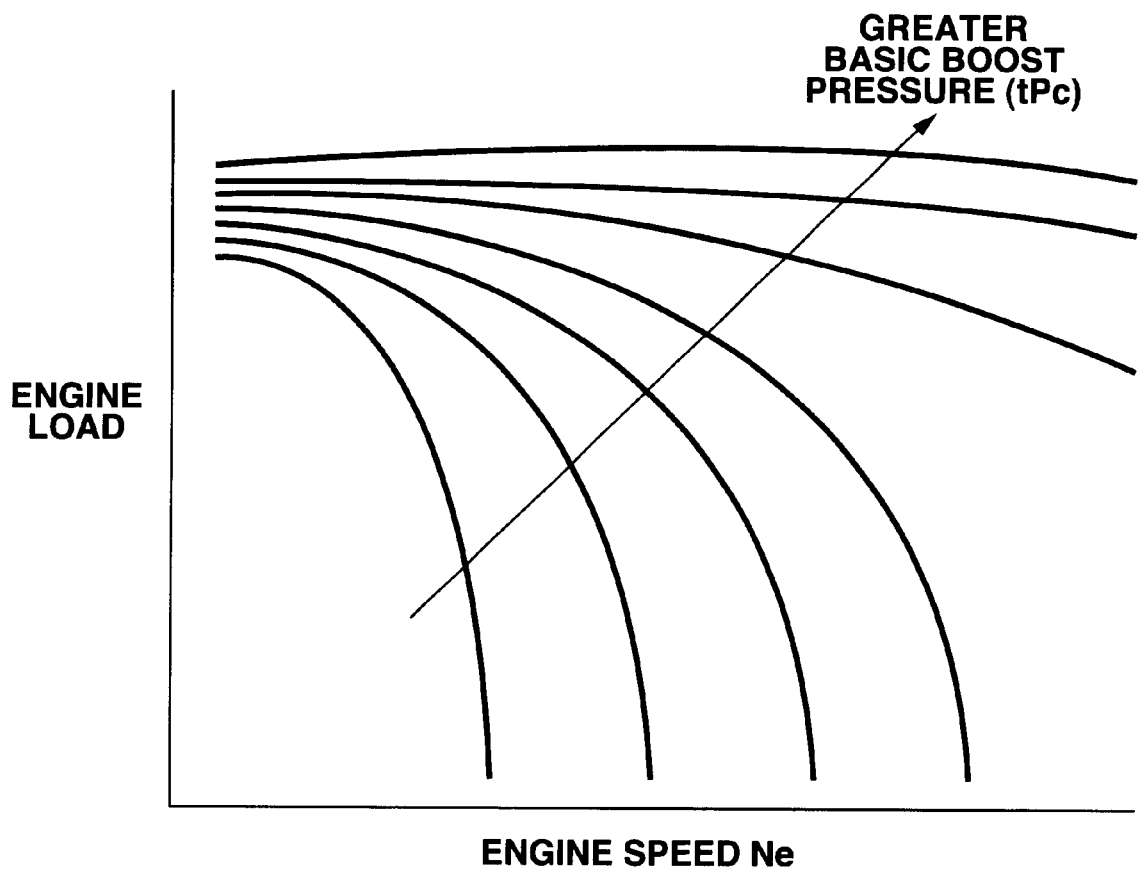
FIG. 12 is a preprogrammed characteristic map showing the relationship among engine speed Ne, engine load, and a basic boost pressure tPc.

Referring now to FIG. 11, at step 51, a test is made to determine whether the target excess air factor $t\lambda$ is above "1.0". When the answer to step 51 is in the affirmative (YES), in case of $t\mu>1.0$, the ECU determines that the engine is operated at the lean combustion mode (at the homogeneous lean combustion mode or at the stratified combustion mode), and then step 52 occurs. At step 52, the actual boost pressure rPc, which is detected by the pressure sensor 26 located upstream of the throttle valve 7, is read. Thereafter, at step 53, the desired equilibrium boost pressure is determined as a basic boost pressure tPc, and the basic boost pressure tPc (desired equilibrium boost pressure) is map-retrieved from a predetermined or preprogrammed basic-boost-pressure (tPc) map showing how the basic boost pressure tPc varies relative to both engine speed (Ne) and engine load. FIG. 12 shows a preprogrammed basic-boost-pressure (tPc) characteristic map. The characteristic shown in FIG. 12 as well as test results shown in FIGS. 9 and 10 is obtained by way of real experimentation by the inventors of the invention.

After step 53, the routine proceeds to step 54. At step 54, the arithmetic section of the ECU 21 arithmetically calculates a boost-pressure correction factor ηp, needed to compensate for the delay in air-quantity change occurring owing to the response delay in actual boost-pressure change. As discussed above in reference to the test data shown in FIG. 10, an intake-air quantity tends to vary in proportion to a boost pressure measured in the induction system upstream of the throttle valve. Therefore, the boost-pressure correction factor ηp is determined as a ratio (tPc/rPc) of the basic boost pressure tPc to the actual boost pressure rPc detected by the pressure sensor 26. That is, the boost-pressure correction factor ηp is represented by the following expression.

$$\eta p = tPc/rPc$$

Thereafter, at step 56, the virtual target air quantity tQad is obtained by multiplying the target air quantity tQa (obtained through step 4 of FIG. 2) by the boost-pressure correction factor ηp (obtained by step 54 of FIG. 11). That is, the virtual target air quantity tQad is represented by the expression tQad=tQaX ηp. Such multiplication of the target air quantity tQa by correction factor ηp (the ratio tPc/rPc of the basic boost pressure tPc to the actual boost pressure rPc) is easy to arithmetically calculate the virtual target air quantity tQad.

Figure 4:
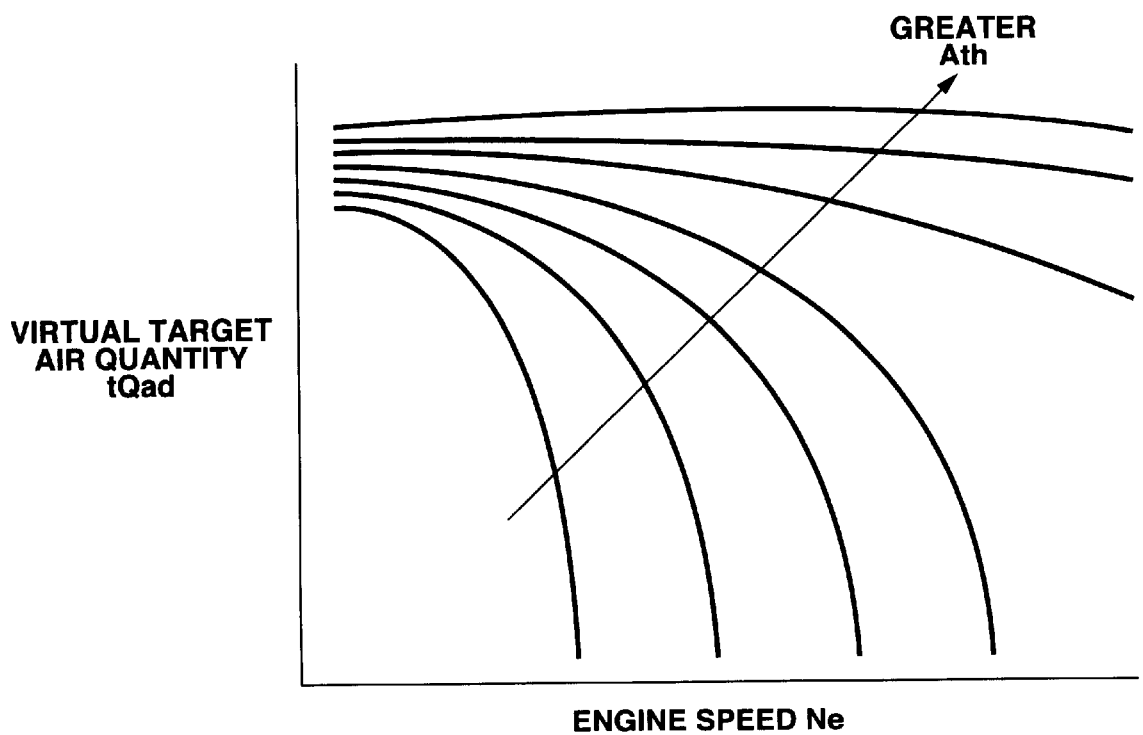
FIG. 4 is a characteristic map showing the relationship among engine speed Ne, a virtual target air quantity tQad, and a target throttle opening area Ath.
Figure 5:
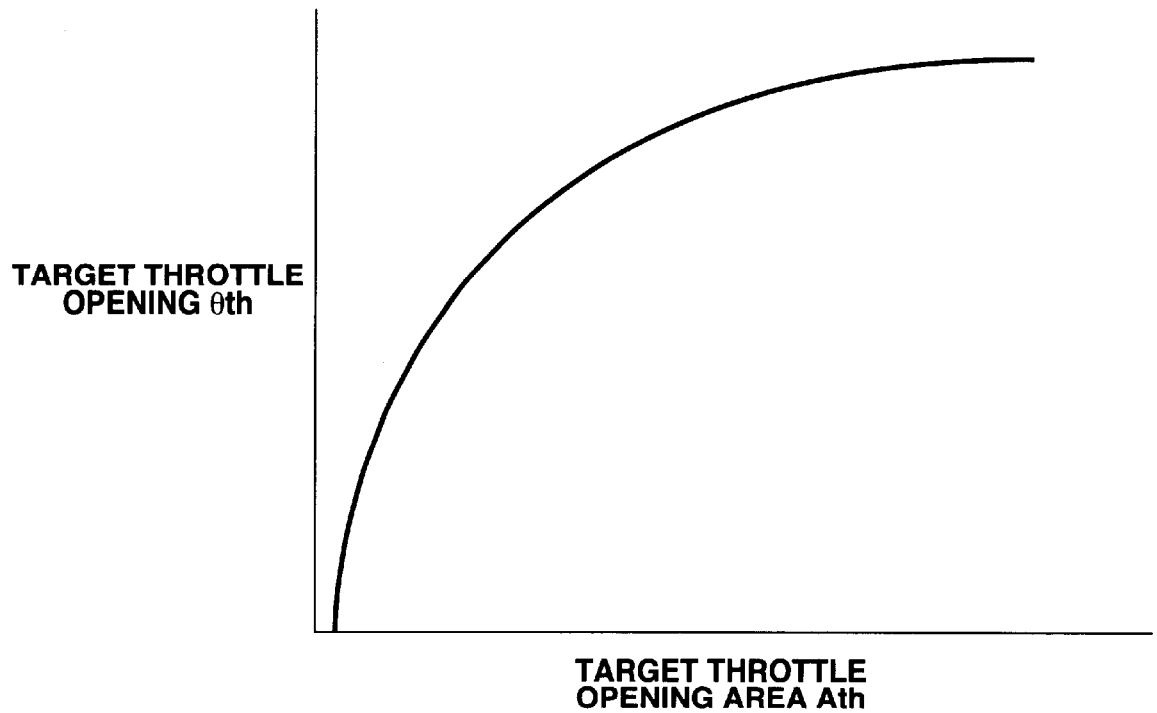
FIG. 5 is a characteristic curve showing the relationship between the target throttle opening area Ath and a target throttle opening θth.

On the other hand, when the answer to step 51 is in the negative (NO), in case of $t\lambda \leq 1.0$, the ECU determines that the engine is operated at the stoichiometric combustion mode (exactly, at the homogeneous stoichiometric combustion mode), and then the routine jumps from step 51 to step 55. At step 55, the ECU automatically sets the boost-pressure correction factor ηp at "1". Thus, during the stoichiometric combustion mode, the control apparatus of the embodiment provides usual response characteristics (or usual engine torque rise/fall characteristics) for intake-air quantity without any boost-pressure correction. As discussed above, during the stoichiometric combustion mode, the arithmetic calculation for the boost-pressure correction factor ηp, shown in step 54, is not executed, and in lieu thereof the correction factor n p is automatically set at "1". This reduces the load to arithmetic calculations within the microcomputer, since the division process indicated by tPc/rPc requires a relatively great load to arithmetic calculation. After the virtual target air quantity tQad is computed through a series of steps of FIG. 11, the routine returns to step 6 of FIG. 2 (the main routine). At step 6 of FIG. 2, a target throttle-valve opening area (a target throttle opening area) Ath is arithmetically calculated on the basis of the virtual target air quantity tQad. In the control apparatus of the embodiment, the target throttle opening area Ath is map-retrieved from a predetermined or preprogrammed characteristic map of FIG. 4 showing how the target throttle opening Ath varies relative to both engine speed Ne and a virtual target air quantity tQad. Then, at step 7 of FIG. 2, a target throttle opening θth is arithmetically calculated on the basis of the target throttle opening area Ath. The relationship between the target throttle opening area Ath and the target throttle opening θth is determined depending on the shape and size of the throttle body constructing the electronically-controlled throttle valve unit. Actually, the target throttle opening θth is retrieved from a predetermined or preprogrammed look-up table shown in FIG. 5 showing the correlation between a target throttle opening area Ath and a target throttle opening θth. The output interface of the ECU 21 outputs a command signal indicative of the target throttle opening θth obtained through a series of steps of FIG. 2 to the throttle control device 8. Thus, the throttle control device 8 outputs a controlled variable corresponding to the target throttle opening θth to the throttle actuator device, so that the actual throttle opening of the throttle valve 7 is adjusted to the target throttle opening θth. The operation of the control apparatus of the embodiment (related to the main routine of FIG. 2, and the sub-routines of FIGS. 6, 7, and 11) is described hereunder in reference to the timing charts shown in FIG. 13A–13E.

Figure 13A:
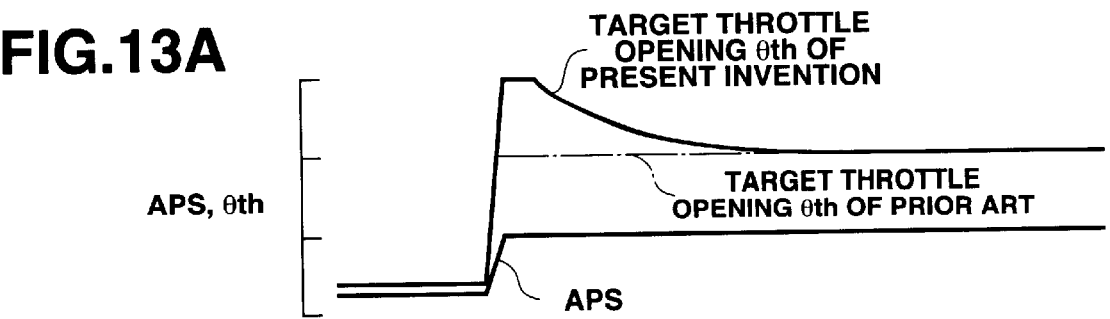
FIGS. 13A–13E are timing charts explaining the operation of the system of the embodiment, executing the virtual-target-air-quantity (tQad) arithmetic-calculation routine of FIG. 11.
Figure 13B:
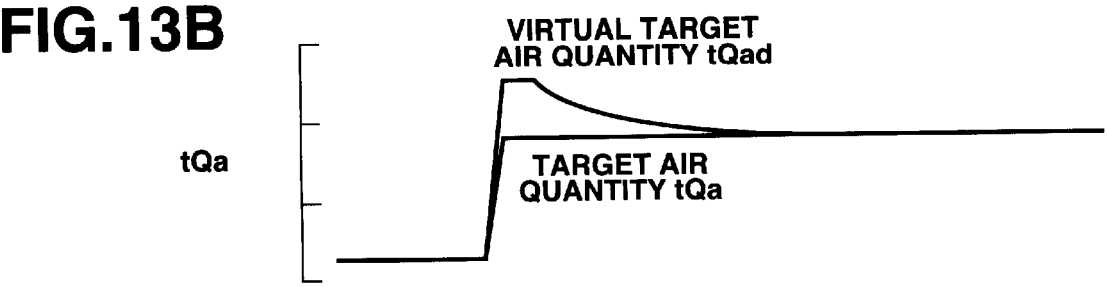
Figure 13C:
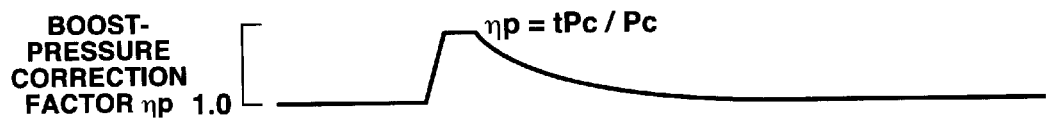
Figure 13D:
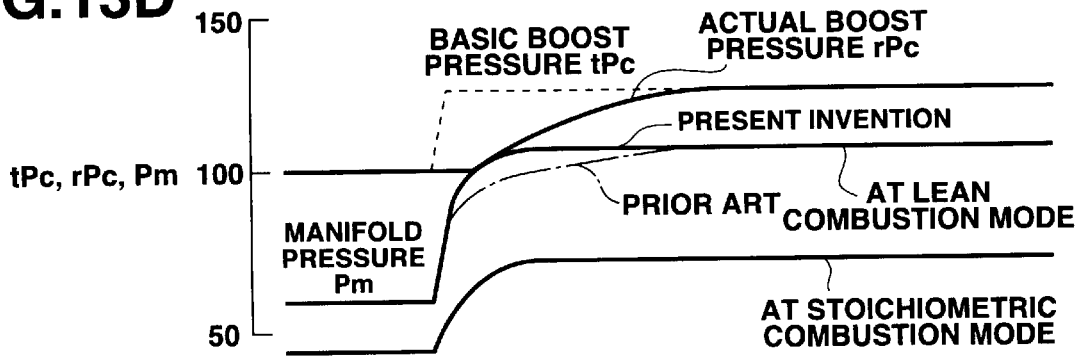
Figure 13E:
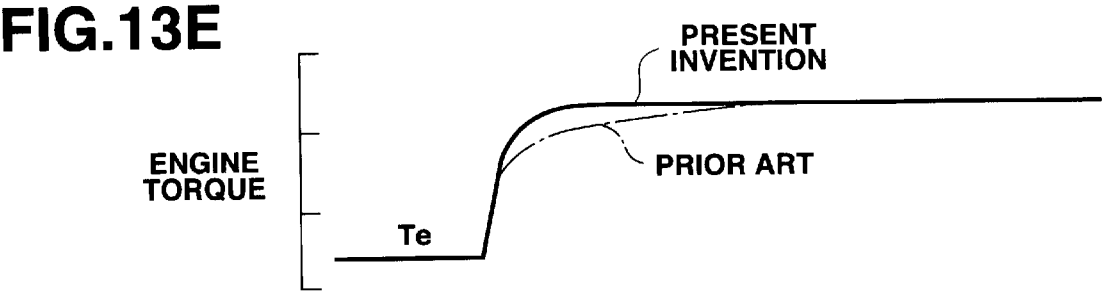

As seen in FIG. 13D, when the engine/vehicle is in a lean combustion mode (in an operating region of a lean A/F) at the same acceleration rate as a stoichiometric combustion mode (an operating region of a stoichiometric A/F), there is a delay in development of actual boost pressure rPc with respect to a basic boost pressure tpc. Hitherto, when accelerating in the lean combustion zone, the ECU of the conventional system executes a throttle-valve control in the same manner as an accelerating mode in the stoichiometric combustion zone. Thus, in the prior-art system, there is a problem of the delay in intake-air quantity increase (or the delay in intake manifold pressure Pm rise) (see the one-dotted line shown in FIG. 13D). In contrast to the above, according to the control apparatus of the embodiment, when the actual boost pressure rPc is lower than the basic boost pressure (the desired equilibrium boost pressure) tPc, the boost-pressure correction factor ηp (=tPc/rPc) is determined as a value greater than "1.0" (see FIG. 13C). Thus, the virtual target air quantity tQad is determined as a value greater than the target air quantity tQa by the boost-pressure correction factor ηp (see FIG. 13B). As a result, the throttle opening θth based on the virtual target air quantity tQad becomes greater as compared to that obtained by the prior-art system (see FIG. 13A). In FIG. 13A, the solid line indicates variations in throttle opening θth obtained through the control apparatus of the invention, whereas the one-dotted line indicates variations in throttle opening obtained through the prior-art system. As can be appreciated from comparison between the solid line (present invention) and the one-dotted line (prior art) shown in FIG. 13A, even when the boost pressure (rPc) has not yet developed sufficiently during the accelerating condition at the lean combustion mode, the control apparatus of the embodiment permits the target air quantity tQa to be fed or drawn into the engine by the use of the virtual target air quantity tQad. Therefore, even when accelerating within the lean combustion zone (in the operating region of a lean A/F), the control apparatus of the embodiment can provide the same engine torque rise characteristics as the accelerating condition within the stoichiometric combustion zone (in the operating region of a stoichiometric A/F) (see the characteristic curve indicated by the solid line of FIG. 13E). That is, the control apparatus of the embodiment avoids an undesirable engine-torque fall occurring due to a lack of a quantity of air drawn into the engine (due to the response delay in an actual boost pressure), when accelerating at the lean combustion mode. Additionally, the control apparatus of the embodiment avoids an undesirable engine-torque rise occurring due to excess air drawn into the engine (due to the response delay in an actual boost pressure), when decelerating at the lean combustion mode. In other words, the control apparatus of the embodiment eliminates the difference between two different transient engine-torque (Te) response characteristics occurring depending on whether the engine is in the stoichiometric combustion mode or in the lean combustion mode, that is, uncomfortable feeling such as a so-called "turbo-lag" during a transient operating state such as during an accelerating condition or during a decelerating condition.

As set forth above, according to the control apparatus of the embodiment, the ECU compensates for the target air quantity tQa responsively to the difference between the actual boost pressure rPc and the basic boost pressure tPc. The compensated target air quantity is determined as the virtual target air quantity tQad. The ECU controls the opening of the throttle valve, so that the virtual target air quantity tQad is produced. When the actual boost pressure rPc is lower than the basic boost pressure tPc, the ECU controls the throttle control device 8 in such a manner as to drive the throttle valve 7 in its valve-open direction, for an increase in the intake-air quantity. Conversely, when the actual boost pressure rPc has developed up to a higher level than the basic boost pressure tPc, the ECU controls the throttle control device 8 in such a manner as to drive the throttle valve 7 in its valve-closure direction, for a decrease in the intake-air quantity. Thus, during the lean combustion mode, it is possible to realize a change (increase/decrease) in a quantity air entering the engine in a transient operating state (during an accelerating condition or during a decelerating condition) in the same pattern as during the stoichiometric combustion mode, without regard to the setting of an air/fuel mixture ratio (A/F), and a developmental state of boost pressure. As a consequence, during the transient operating state at the lean combustion mode, the control apparatus of the embodiment can provide the same engine-torque rise/fall characteristics as during the transient operating state at the stoichiometric combustion mode, regardless of the setting of the A/F and the development state of boost pressure. This eliminates uncomfortable feeling (poor driveability), during acceleration/deceleration at the lean combustion mode.

Figure 14:
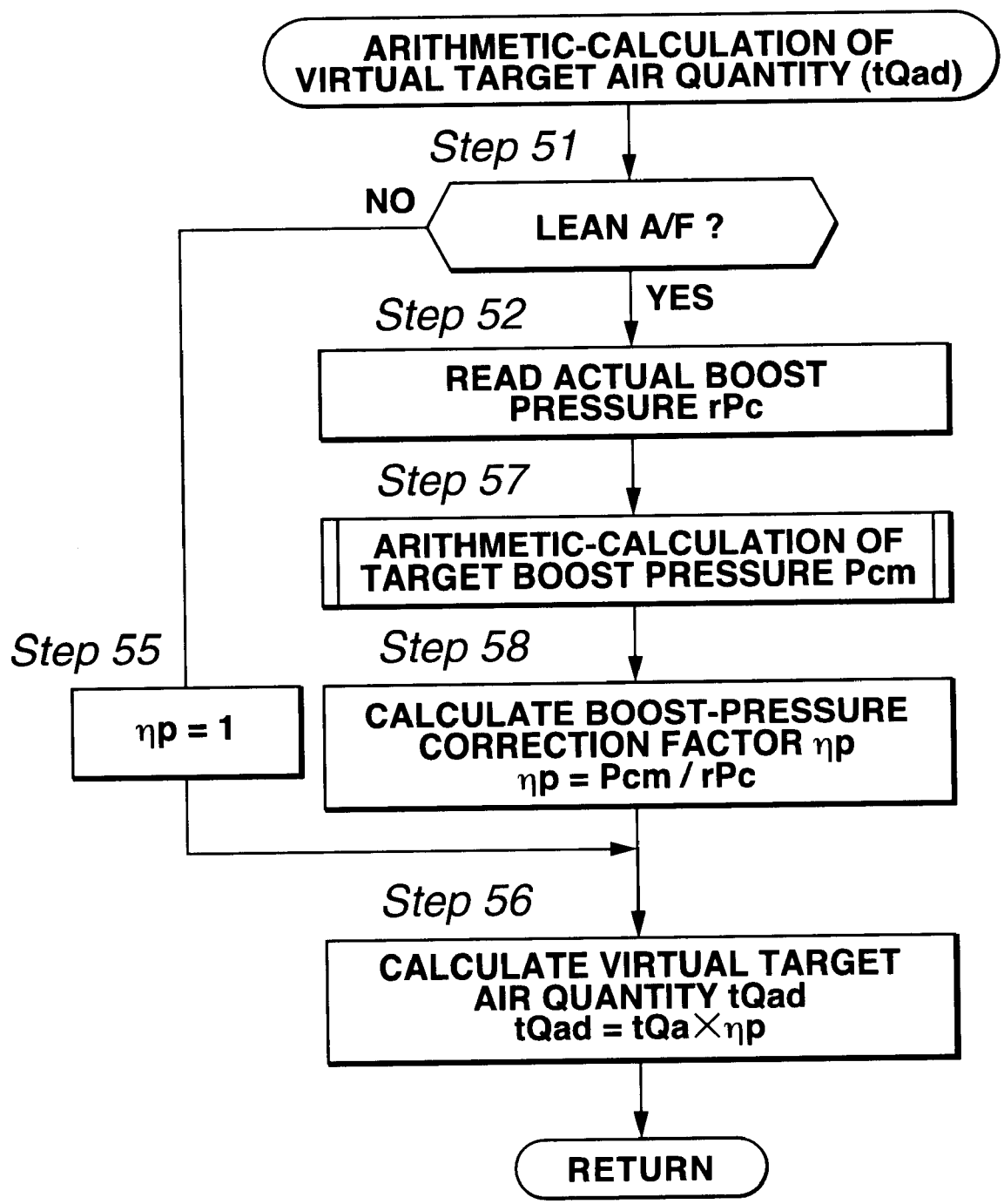
FIG. 14 shows a modified virtual-target-air-quantity (tQad) arithmetic-calculation routine related to step 5 of FIG. 2.

Referring now to FIG. 14, there is shown a modified virtual-target-air-quantity (tQad) arithmetic-calculation routine executed by the processor of the ECU 21 employed in the control apparatus of the embodiment. The modified arithmetic processing shown in FIG. 14 is also executed as time-triggered interrupt routines to be triggered every predetermined time intervals such as 10 milliseconds. The modified arithmetic processing of FIG. 14 is similar to the arithmetic processing of FIG. 11, except that steps 53 and 54 included in the sub-routine shown in FIG. 11 are replaced with steps 57 and 58 included in the sub-routine shown in FIG. 14. According to the routine shown in FIG. 11, the basic boost pressure tPc is set as a target boost pressure or a desired boost pressure (that is, the desired equilibrium boost pressure), and then the boost-pressure correction factor ηp is obtained by the expression ηp=tPc/rPc. On the other hand, according to the modified routine shown in FIG. 14, either one of three combustion modes, namely the stratified combustion mode, the homogeneous lean combustion mode, and the homogeneous stoichiometric combustion mode, is determined as the current combustion mode, and a weighted average (either one of Pcm1, Pcm2 and Pcm3) of the basic boost pressure corresponding to the current combustion mode is set as a target boost pressure Pcm, and then a boost-pressure correction factor ηp is obtained by an expression ηp=Pcm/rPc, as described later. Thus, the same step numbers used to designate steps in the routine shown in FIG. 11 will be applied to the corresponding step numbers used in the modified arithmetic processing shown in FIG. 14, for the purpose of comparison of the two different interrupt routines. Steps 57 and 58 will be hereinafter described in detail with reference to the accompanying drawings, while detailed description of steps 51, 52, 55, and 56 will be omitted because the above description thereon seems to be self-explanatory.

Figure 15:
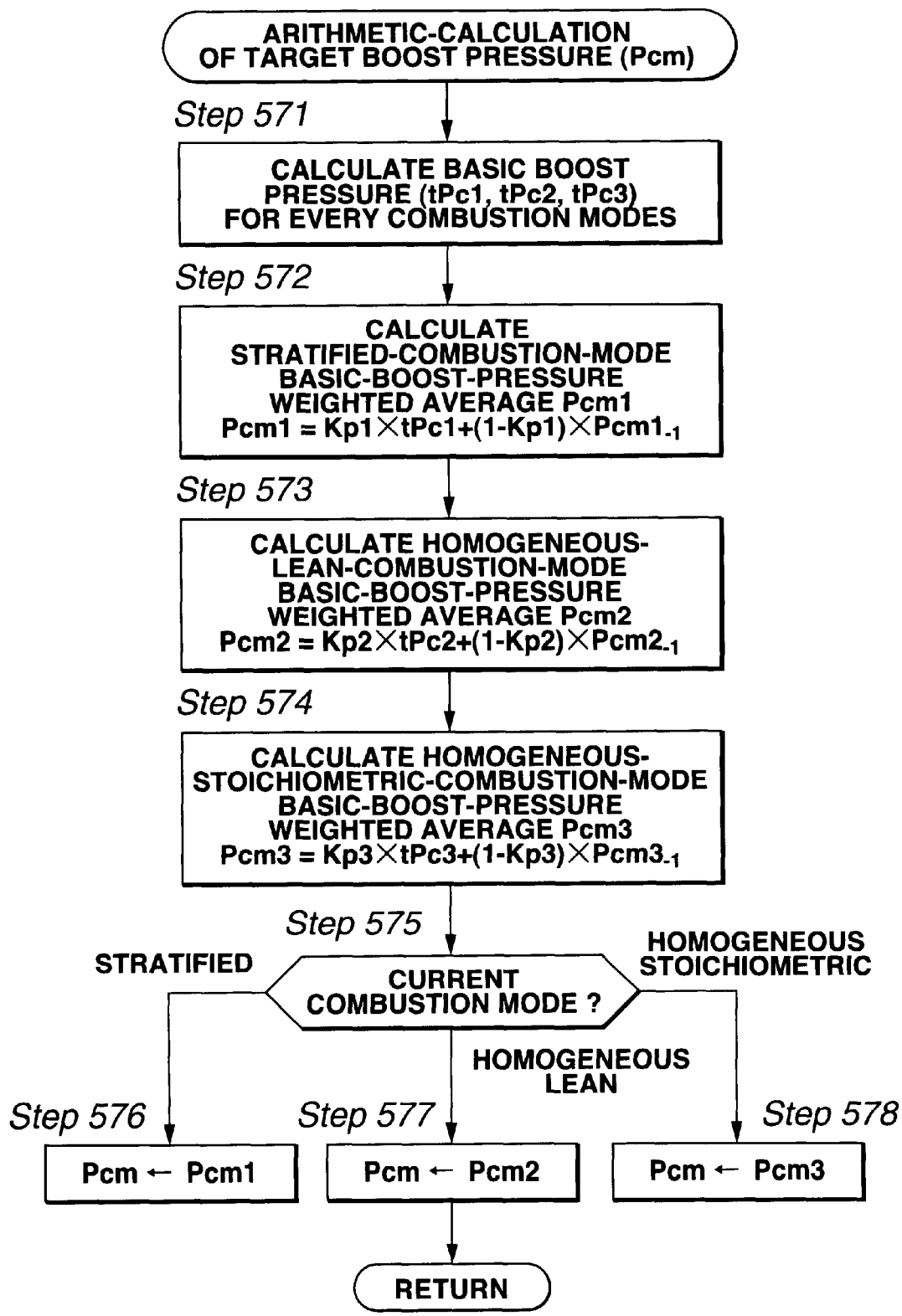
FIG. 15 is a flow chart illustrating a target-boost-pressure (Pcm) arithmetic-calculation routine related to step 57 of FIG. 14.

At step 57 of FIG. 14, the target boost pressure Pcm is arithmetically calculated. The arithmetic calculation for the target boost pressure Pcm is executed in accordance with the sub-routine shown in FIG. 15. The sub-routine shown in FIG. 15 is executed as time-triggered interrupt routines to be triggered every predetermined time intervals such as 10 milliseconds. At step 58 of FIG. 14, the boost-pressure correction factor ηp is calculated as the ratio (Pcm/rPc) of the target boost pressure Pcm to the actual boost pressure rPc.

At step 571 of FIG. 15, a basic boost pressure tPc1 used at the stratified combustion mode is arithmetically calculated or map-retrieved from a predetermined or preprogrammed characteristic map showing how the basic boost pressure tPc1 used at the stratified combustion mode varies relative to both engine speed Ne and engine load. In the same manner, a basic boost pressure tPc2 used at the homogeneous lean combustion mode is arithmetically calculated or map-retrieved from a predetermined or preprogrammed characteristic map showing how the basic boost pressure tPc2 used at the homogeneous lean combustion mode varies relative to both engine speed Ne and engine load. Additionally, a basic boost pressure tPc3 used at the homogeneous stoichiometric combustion mode is arithmetically calculated or map-retrieved from a predetermined or preprogrammed characteristic map showing how the basic boost pressure tPc3 used at the homogeneous stoichiometric combustion mode varies relative to both engine speed Ne and engine load. The ECU 21 uses the characteristic map as summarized and shown in FIG. 12 as preprogrammed basic-boost-pressure (tPc1, tPc2, tPc3) characteristic maps respectively suitable for stratified, homogeneous lean, and homogeneous stoichiometric combustion modes.

At step 572 of FIG. 15, a weighted average Pcm1 for the basic boost pressure tPc1 used at the stratified combustion mode is arithmetically calculated from the following expression, for phase compensation for the weighted average Pcm1 for the basic boost pressure tPc1 used at the stratified combustion mode.

$$Pcm1 = Kp1 \times tPc1 + (1-Kp1) \times Pcm1_{-1}$$

where Pcm1 denotes a current value of the weighted average for the basic boost pressure tPc1 used at the stratified combustion mode, Kp1 denotes a weighted-average coefficient suitable for the stratified combustion mode, and $Pcm1_{-1}$ denotes a previous value of the weighted average for the basic boost pressure tPc1 used at the stratified combustion mode.

At step 573 of FIG. 15, a weighted average Pcm2 for the basic boost pressure tPc2 used at the homogeneous lean combustion mode is arithmetically calculated from the following expression, for phase compensation for the weighted average Pcm2 for the basic boost pressure tPc2 used at the homogeneous lean combustion mode.

$$Pcm2 = Kp2 \times tPc2 + (1-Kp2) \times Pcm2_{-1}$$

where Pcm2 denotes a current value of the weighted average for the basic boost pressure tPc2 used at the homogeneous lean combustion mode, Kp2 denotes a weighted-average coefficient suitable for the homogeneous lean combustion mode, and $Pcm2_{-1}$ denotes a previous value of the weighted average for the basic boost pressure tPc2 used at the homogeneous lean combustion mode.

At step 574 of FIG. 15, a weighted average Pcm3 for the basic boost pressure tPc3 used at the homogeneous stoichiometric combustion mode is arithmetically calculated from the following expression, for phase compensation for the weighted average Pcm3 for the basic boost pressure tPc3 used at the homogeneous stoichiometric combustion mode.

$$Pcm3 = Kp3 \times tPc3 + (1-Kp3) \times Pcm3_{-1}$$

where Pcm3 denotes a current value of the weighted average for the basic boost pressure tPc3 used at the homogeneous stoichiometric combustion mode (simply, stoichiometric combustion mode), Kp3 denotes a weighted-average coefficient suitable for the homogeneous stoichiometric combustion mode, and $Pcm3_{-1}$ denotes a previous value of the weighted average for the basic boost pressure tPc3 used at the homogeneous stoichiometric combustion mode.

Figure 16:
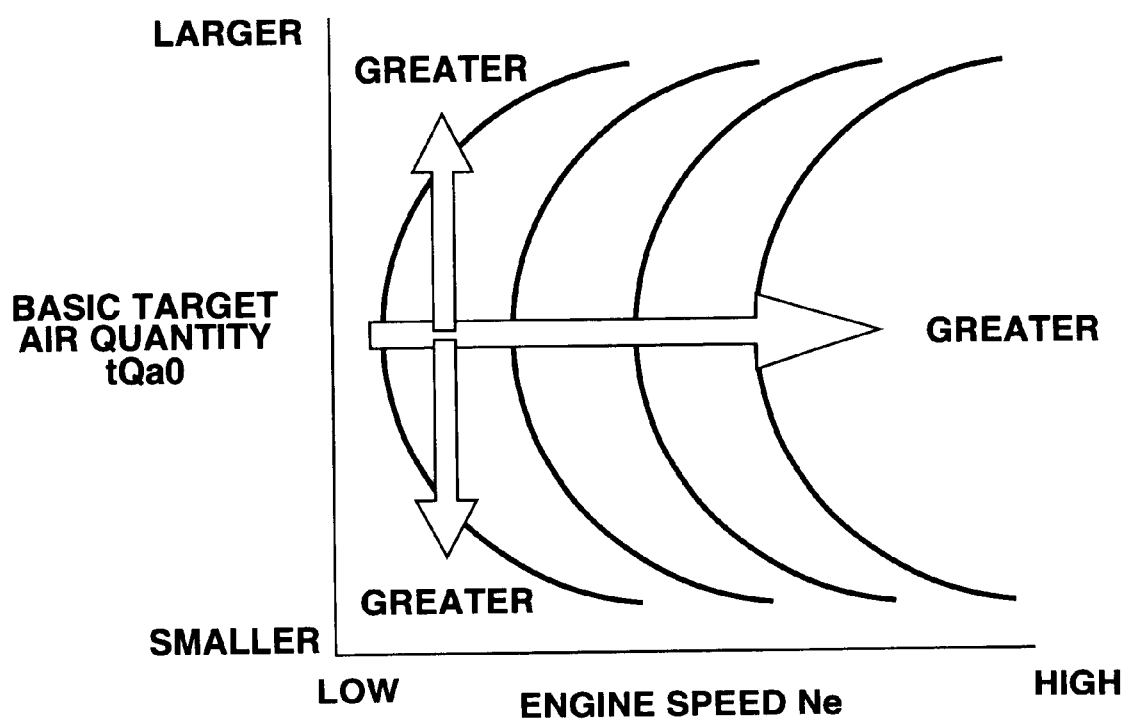
FIG. 16 shows one example of a weighted-average-coefficient characteristic diagram illustrating the relationship among engine speed Ne, a basic target air quantity tQa0, and a weighted-average coefficient (Kp1, Kp2, Kp3).

The previously-noted weighted-average coefficients Kp1, Kp2, and Kp3, respectively suitable for the stratified combustion mode, the homogeneous lean combustion mode, and the homogeneous stoichiometric combustion mode, will be hereinafter referred to as a "stratified-combustion-mode basic-boost-pressure weighted-average coefficient", a "homogeneous-lean-combustion-mode basic-boost-pressure weighted-average coefficient", and a "homogeneous-stoichiometric-combustion-mode basic-boost-pressure weighted-average coefficient". Each of the weighted-average coefficients Kp1, Kp2 and Kp3 corresponds to the determining factor of a degree of leading edge (or rise) of the target boost pressure tPc, during the accelerating condition (see FIG. 17B). The three weighted-average coefficients Kp1, Kp2, and Kp3 are designed to satisfy the relationship defined by the inequality Kp1>Kp2>Kp3. The stratified-combustion-mode basic-boost-pressure weighted-average coefficient Kp1, the homogeneous-lean-combustion-mode basic-boost-pressure weighted-average coefficient Kp2, and the homogeneous-stoichiometric-combustion-mode basic-boost-pressure weighted-average coefficient Kp3 are arithmetically calculated or map-retrieved from respective predetermined or preprogrammed characteristic maps. The ECU 21 uses the preprogrammed basic-boost-pressure weighted-average coefficient characteristic map as summarized and shown in FIG. 16 as preprogrammed basic-boost-pressure weighted-average coefficient characteristic maps respectively suitable for stratified, homogeneous lean, and homogeneous stoichiometric combustion modes. The characteristic map of FIG. 16 shows how the basic-boost-pressure weighted-average coefficient (Kp1, Kp2, Kp3) varies relative to both engine speed Ne and a basic target air quantity tQaO.

At step 575 of FIG. 15, the ECU 21 determines the current engine operating mode (or the current engine operating point) on the basis of the latest up-to-date information related to engine operating conditions, that is, engine speed Ne and engine load. When the engine is operated in the stratified combustion mode, the routine proceeds to step 576 where the more recent target boost pressure data Pcm is updated by the stratified-combustion-mode basic-boost-pressure weighted average Pcm1. When the engine is operated in the homogeneous lean combustion mode, the routine proceeds to step 577 where the more recent target boost pressure data Pcm is updated by the homogeneous-lean-combustion-mode basic-boost-pressure weighted average Pcm2. When the engine is operated in the homogeneous stoichiometric combustion mode, the routine proceeds to step 578 where the more recent target boost pressure data Pcm is updated by the homogeneous-stoichiometric-combustion-mode basic-boost-pressure weighted average Pcm3. The way to determine the target boost pressure Pcm is dependent on engine specifications. As can be appreciated the timing charts shown in FIGS. 17A, 17B, and 17C, when the accelerator operated amount APS rapidly increases, the target boost pressure Pcm rises while drawing a curved line (see the upwardly-curved leading edge of the target-boost-pressure (Pcm) characteristic curve shown in FIG. 17B). That is, as appreciated from the three expressions related to steps 572, 573, and 574, the control apparatus of the second embodiment, related to the main routine of FIG. 2, and the sub-routines of FIGS. 6, 7, 14 and 15, is able to desiredly generate the target boost pressure Pcm with a first-order lag.

Referring now to FIG. 18, there is shown an example of a preprogrammed basic-boost-pressure weighted-average coefficient characteristic diagram showing how the basic-boost-pressure weighted-average coefficient (Kp1, Kp2, Kp3) varies relative to only the product (APS×Ne) of an accelerator operated amount APS and engine speed Ne. In lieu of the characteristic map of FIG. 16, the ECU 21 uses the preprogrammed look-up table as summarized and shown in FIG. 18 (indicating the relationship between a basic-boost-pressure weighted-average coefficient and a product (APS×Ne) of an accelerator operated amount APS and engine speed Ne) as preprogrammed basic-boost-pressure weighted-average coefficient (Kp1, Kp2, Kp3) characteristic tables respectively suitable for stratified, homogeneous lean, and homogeneous stoichiometric combustion modes. The use of the preprogrammed look-up table shown in FIG. 18 is superior to the preprogrammed characteristic map shown in FIG. 16, in the amount of data, that is, the reduced memory storage capacity (reduced ROM capacity), and the reduced load to arithmetic calculation in the CPU of the ECU 21.

Figure 19:
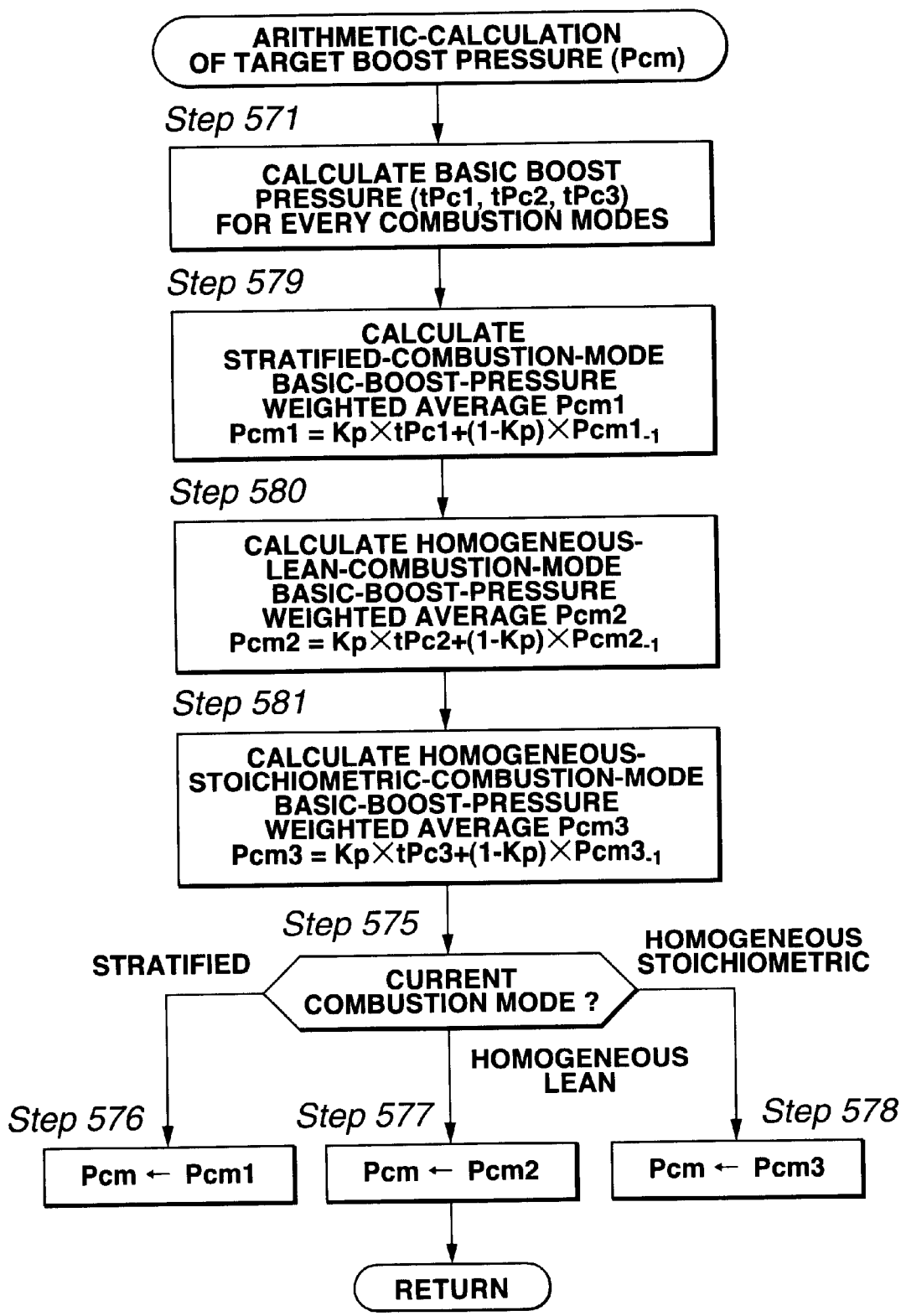
FIG. 19 shows a modified target-boost-pressure (Pcm) arithmetic-calculation routine.

Referring now to FIG. 19, there is shown another target-boost-pressure (Pcm) arithmetic-calculation routine. FIG. 20 shows a predetermined or preprogrammed basic-boost-pressure weighted-average coefficient (Kp) look-up table used at steps 579–581 of FIG. 19. In order to calculate or estimate a target boost pressure Pcm, the target-boost-pressure arithmetic-calculation routine shown in FIGS. 15 and 16 may be replaced by the routine shown in FIGS. 19 and 20. The modified arithmetic processing of FIG. 19 is similar to the arithmetic processing of FIG. 15, except that steps 572, 573 and 574 included in the sub-routine shown in FIG. 15 are replaced with steps 579, 580 and 581 included in the sub-routine shown in FIG. 19. Thus, the same step numbers used to designate steps in the routine shown in FIG. 15 will be applied to the corresponding step numbers used in the modified arithmetic processing shown in FIG. 19, for the purpose of comparison of the two different interrupt routines. Steps 579, 580 and 581 will be hereinafter described in detail in reference to FIG. 20, while detailed description of steps 571, 575, 576, 577 and 578 will be omitted because the above description thereon seems to be self-explanatory.

Steps 579, 580, and 581 use the same basic-boost-pressure weighted-average coefficient Kp. The representative basic-boost-pressure weighted-average coefficient Kp is arithmetically calculated or looked up on the basis of the product (APS×Ne×tλ) of three data, namely an accelerator operated amount APS, engine speed Ne, and a target excess air factor tλ in the preprogrammed look-up table shown in FIG. 20. In the characteristic look-up table of FIG. 20, assuming that engine speed Ne and an accelerator operated amount APS are both held constant, the representative basic-boost-pressure weighted-average coefficient Kp varies depending on the target excess air factor tλ. The target excess air factor tλ itself is different depending on whether the engine is in a stratified combustion mode, a homogeneous-lean combustion mode, or in a homogeneous-stoichiometric combustion mode (see the characteristic map shown in FIG. 8). That is, the preprogrammed basic-boost-pressure weighted-average coefficient (Kp) look-up table includes information concerning the combustion condition (combustion mode) of the engine.

Suppose the ECU 21 computes a basic-boost-pressure weighted-average coefficient from the preprogrammed look-up table as shown in FIG. 18, the control apparatus requires three different look-up tables for a stratified-combustion-mode basic-boost-pressure weighted-average coefficient Kp1, a homogeneous-lean-combustion-mode basic-boost-pressure weighted-average coefficient Kp2, and a homogeneous-stoichiometric-combustion-mode basic-boost-pressure weighted-average coefficient Kp3. On the other hand, suppose the ECU 21 uses only one preprogrammed look-up table shown in FIG. 20 for computation of a basic-boost-pressure weighted-average coefficient Kp. The coefficient Kp determined by the look-up table of FIG. 20 functions as a representative value of the basic-boost-pressure weighted-average coefficient, common to all of stratified, and homogeneous-lean, and homogeneous-stoichiometric combustion modes. The use of only one look-up table data is superior to three look-up table data, from a viewpoint of reduced computational burden of arithmetically calculating the basic-boost-pressure weighted-average coefficient, and reduced ROM capacity.

Figure 21:
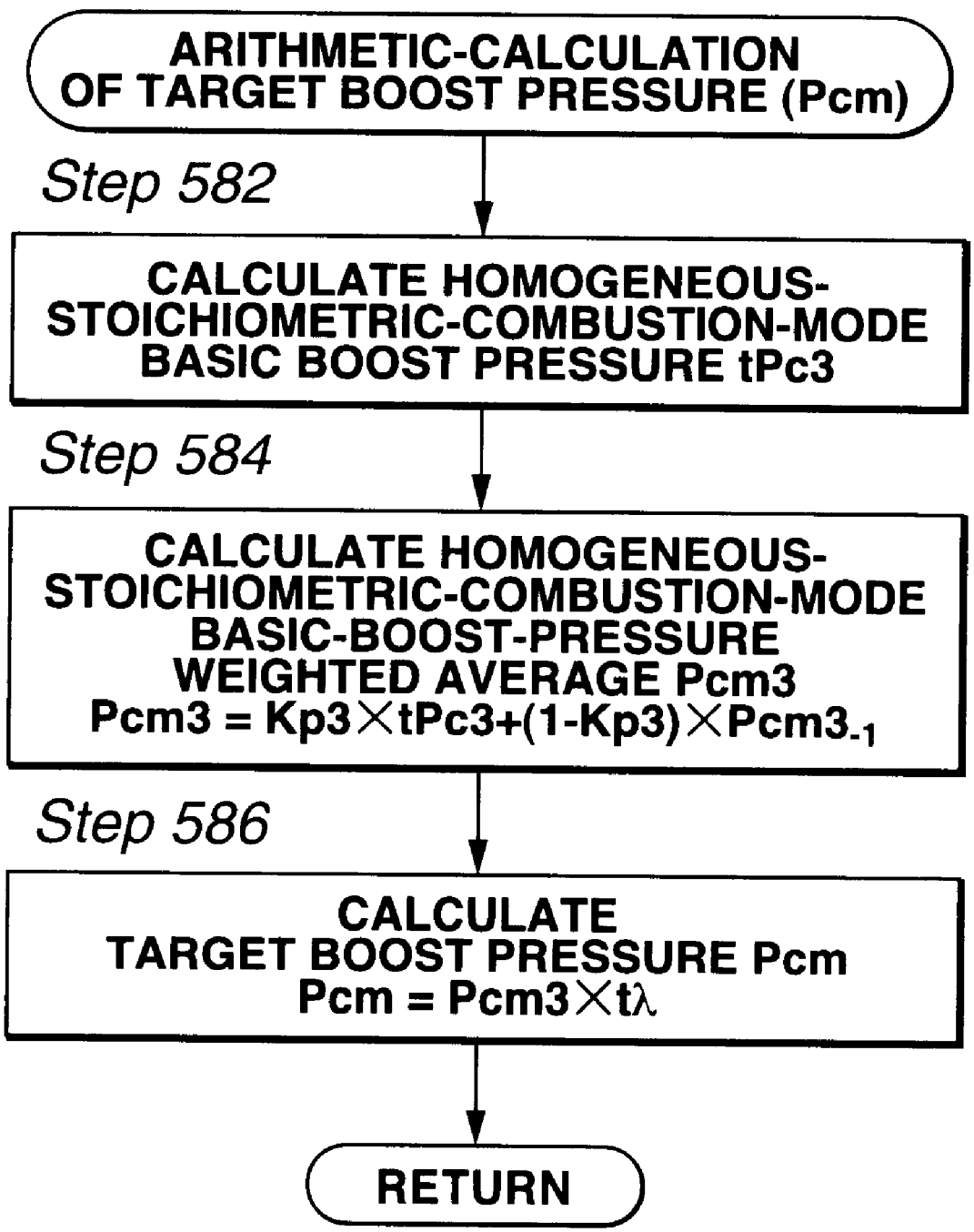
FIG. 21 shows another target-boost-pressure (Pcm) arithmetic-calculation routine.

Referring to FIG. 21, there is shown another target-boost-pressure (Pcm) arithmetic-calculation routine. The control apparatus of the embodiment may use the sub-routine shown in FIG. 21 instead of the routine shown in FIG. 15. According to the arithmetic-calculation routine shown in FIG. 21, the arithmetic section of the ECU 21 merely requires a characteristic map needed to retrieve a basic boost pressure tPc3 used at a homogeneous stoichiometric combustion mode (a target excess air factor tλ=1.0) and a characteristic map needed to retrieve homogeneous-stoichiometric-combustion-mode basic-boost-pressure weighted-average coefficient Kp3, without using a stratified-combustion-mode basic boost pressure tPc1, a homogeneous-lean-combustion-mode basic boost pressure tPc2, a stratified-combustion-mode basic-boost-pressure weighted-average coefficient Kp1, and a homogeneous-lean-combustion-mode basic-boost-pressure weighted-average coefficient Kp2.

At step 582 of FIG. 21, a homogeneous-stoichiometric-combustion-mode basic boost pressure tPc3 is arithmetically calculated or map-retrieved from a preprogrammed map showing how the homogeneous-stoichiometric-combustion-mode basic boost pressure tPc3 varies relative to both engine speed Ne and engine load.

At step 584 of FIG. 21, a homogeneous-stoichiometric-combustion-mode basic-boost-pressure weighted average Pcm3 is arithmetically calculated from the following expression, for phase compensation for the weighted average Pcm3 for the homogeneous-stoichiometric-combustion-mode basic boost pressure tPc3.

$$Pcm3 = Kp3 \times tPc3 + (1-Kp3) \times Pcm3_{-1}$$

where Pcm3 denotes a current value of the weighted average for the basic boost pressure tPc3 used at the homogeneous stoichiometric combustion mode and obtained at the current cycle, Kp3 denotes a weighted-average coefficient suitable for the homogeneous stoichiometric combustion mode, and $Pcm3_{-1}$ denotes a previous value of the weighted average for the basic boost pressure tPc3 used at the homogeneous stoichiometric combustion mode and obtained one cycle before. The homogeneous-stoichiometric-combustion-mode basic-boost-pressure weighted-average coefficient Kp3 is map-retrieved on the basis of engine speed Ne and engine load from a preprogrammed characteristic map.

At step 586 of FIG. 21, a target boost pressure Pcm is obtained by multiplying the target excess air factor $t\lambda$ with the current value Pcm3 of the homogeneous-stoichiometric-combustion-mode basic-boost-pressure weighted average. That is, the target boost pressure Pcm is represented as follows.

$$Pcm = Pcm3 \times t\lambda$$

where Pcm3 denotes the latest up-to-date homogeneous-stoichiometric-combustion-mode basic-boost-pressure weighted average, and $t\lambda$ denotes a target excess air factor. As discussed above, the target excess air factor $t\lambda$ is determined depending on the selected combustion mode. In other words, the expression ($Pcm=Pcm3 \times t\lambda$) indicated at step 586 of FIG. 21 reflects the combustion condition (combustion mode) of the engine. For instance, when the engine is operated in the homogeneous stoichiometric combustion mode, the target excess air factor $t\lambda$ is set at 1.0, and thus the relation of Pcm=Pcm3 is satisfied. On the other hand, during the homogeneous lean combustion mode or during the stratified combustion mode (exactly during the lean stratified combustion mode or during the ultra-lean stratified combustion mode), the target excess air factor $t\lambda$ is set at a value greater than 1.0, and then the control apparatus (the control system) of the embodiment can produce a higher target boost pressure Pcm as compared to the homogeneous stoichiometric combustion mode (see FIG. 22). For the purpose of matching at the homogeneous lean combustion mode and at the stratified combustion mode, a matching constant K is further introduced into the previously-noted expression $Pcm=Pcm3 \times t\lambda$. In this case, the target boost pressure Pcm is represented as follows.

$$Pcm = Pcm3 \times t\lambda \times K$$

It is advantageous to use the sub-routine of FIG. 21 rather than the sub-routine of FIG. 15, from a viewpoint of reduced computational burden of arithmetically calculating the basic boost pressure and the basic-boost-pressure weighted-average coefficient, and reduced ROM capacity. In the target-boost-pressure arithmetic processing shown in FIGS. 21 and 22, the homogeneous-stoichiometric-combustion-mode basic-boost-pressure weighted average Pcm3 (in case of $t\lambda=1.0$) is used as a reference value needed to compute a target boost pressure (Pcm) used at a lean combustion mode (i.e., a homogeneous lean combustion mode or a stratified combustion mode). Alternatively, the stratified-combustion-mode basic-boost-pressure weighted average Pcm1 (in case of $t\lambda>1.0$) may be used as a reference value needed to compute a target boost pressure (Pcm) used at a homogeneous lean combustion mode and a target boost pressure (Pcm) used at a homogeneous stoichiometric combustion mode. In this case, the target boost pressure Pcm is represented as follows.

$$Pcm = Pcm1 \times t\lambda \times K1$$

where K1 denotes a matching constant for matching at the homogeneous lean combustion mode and the homogeneous stoichiometric combustion mode.

In a similar manner, the homogeneous-lean-combustion-mode basic-boost-pressure weighted average Pcm2 (in case of $t\lambda>1.0$) may be used as a reference value needed to compute a target boost pressure (Pcm) used at a stratified combustion mode and a target boost pressure (Pcm) used at a homogeneous stoichiometric combustion mode. In this case, the target boost pressure Pcm is represented as follows.

$$Pcm = Pcm2 \times t\lambda \times K2$$

where K2 denotes a matching constant for matching at the stratified combustion mode and the homogeneous stoichiometric combustion mode.

As explained above, in the control apparatus of the second embodiment (related to the main routine of FIG. 2, the sub-routines of FIGS. 6, 7, 14 and 15 and the characteristic map of FIG. 16), the third embodiment (related to the main routine of FIG. 2, and the sub-routines of FIGS. 6, 7, 14 and 15, and the look-up table of FIG. 18), the fourth embodiment (related to the main routine of FIG. 2, the sub-routines of FIGS. 6, 7, 14 and 19, and the look-up table of FIG. 20), and the fifth embodiment (related to the main routine of FIG. 2, and the sub-routines of FIGS. 6, 7, 14 and 21), a value (Pcm1, Pcm2, Pcm3) being responsive to a basic boost pressure tPc with an output response of a first-order lag is arithmetically calculated as a target boost pressure Pcm. In lieu thereof, a value being responsive to a basic boost pressure tPc with a ramp response may be arithmetically calculated as a target boost pressure Pcm. To more easily obtain the target boost pressure Pcm, it is advantageous to use a ramp response rather than a first-order lag response. In order to provide proper control system characteristics including system sensitivity and system stability and to achieve satisfactory system response, it is desirable to arbitrarily select either one of the first-order lag response and the ramp response, depending on engine/vehicle specifications.

The entire contents of Japanese Patent Application No. P11-97349 (filed Apr. 5, 1999) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An apparatus for controlling an internal combustion engine with a supercharging device operable to produce a desired boost pressure, comprising:

a throttle control device which controls a throttle valve;

a pressure sensor located in an induction system to detect an actual boost pressure;

a control unit being configured to be connected to the throttle control device for arbitrarily controlling a throttle opening of the throttle valve depending on an operated amount of an accelerator; said control unit comprising (a) an arithmetic-calculation section which calculates a target air quantity used in an engine operating region of a lean air/fuel ratio, based on at least the operated amount of the accelerator, (b) an arithmetic-calculation section which calculates the desired boost pressure based on engine speed and engine load, (c) an arithmetic-calculation section which calculates a boost-pressure correction factor responsively to a difference between the desired boost pressure and the actual boost pressure, in the engine operating region of the lean air/fuel ratio, and (d) an arithmetic-calculation section which compensates for the target air quantity used in the engine operating region of the lean air/fuel ratio by the boost-pressure correction factor to generate a compensated target air quantity, and determines the compensated target air quantity as a virtual target air quantity; and a throttle actuator device which drives the electronically-controlled throttle, so that the virtual target air quantity is drawn into the engine.

2. An apparatus for controlling an internal combustion engine with a supercharging device operable to produce a desired boost pressure, comprising:

a throttle control device which controls a throttle valve;

a pressure sensor located in an induction system to detect an actual boost pressure;

a control unit being configured to be electronically connected to the throttle control device for arbitrarily controlling a throttle opening of the throttle valve depending on an operated amount of an accelerator; said control unit comprising (a) an arithmetic-calculation section which calculates a target air quantity based on at least the operated amount of the accelerator, (b) an arithmetic-calculation section which calculates the desired boost pressure based on engine speed and engine load, (c) an arithmetic-calculation section which calculates a boost-pressure correction factor responsively to a difference between the desired boost pressure and the actual boost pressure, and (d) a determination section which determines whether the engine is in an operating region of a lean air/fuel ratio or in an operating region of a stoichiometric air/fuel ratio, and (e) an arithmetic-and-logic section which is responsive to a result determined by the determination section, for compensating for the target air quantity by the boost-pressure correction factor to generate a compensated target air quantity and determining the compensated target air quantity as a virtual target air quantity when the engine is in the operating region of the lean air/fuel ratio, and for determining the target air quantity itself as the virtual target air quantity when the engine is in the operating region of the stoichiometric air/fuel ratio; and a throttle actuator device which drives the throttle valve, so that the virtual target air quantity is drawn into the engine.

3. The apparatus as claimed in claim 1, wherein the target air quantity (tQa) is compensated by a fuel consumption rate (ηf).

4. The apparatus as claimed in claim 1, wherein the boost-pressure correction factor (ηp) is a ratio (tPc/rPc; Pcm/rPc) of the desired boost pressure (tPc; Pcm) to the actual boost pressure (rPc).

5. The apparatus as claimed in claim 2, wherein compensation for the target air quantity (tQa) by the boost-pressure correction factor (ηp) in the operating region of the lean air/fuel ratio is performed within the arithmetic-and-logic section by multiplying the target air quantity (tQa) by the boost-pressure correction factor (ηp), and the arithmetic-and-logic section sets the boost-pressure correction factor at 1 in the operating region of the stoichiometric air/fuel ratio.

6. The apparatus as claimed in claim 1, wherein the arithmetic-calculation section, calculating the target air quantity (tQa) used in the engine operating region of the lean air/fuel ratio, comprises a data processing section:

(1) arithmetically calculating a driver-required air quantity (Qda) based on at least the operated amount (APS) of the accelerator;

(2) arithmetically calculating a required idle air quantity (Qia) based on at least an engine temperature (Tw) and needed to hold a stable engine idling operation;

(3) summing the driver-required air quantity (Qda) and the required idle air quantity (Qia) to generate a sum (Qda+Qia);

(4) setting the sum (Qda+Qia) as a basic target air quantity (tQaO);

(5) arithmetically calculating a target excess air factor (tλ) based on engine operating conditions;

(6) compensating for the basic target air quantity (tQaO) by at least the target excess air factor (tλ) to generate a compensated basic target air quantity; and (7) determining the compensated basic target air quantity as the target air quantity (tQa) in the engine operating region of the lean air/fuel ratio.

7. The apparatus as claimed in claim 2, wherein the arithmetic-calculation section, calculating the target air quantity (tQa), comprises a data processing section:

(1) arithmetically calculating a driver-required air quantity (Qda) based on at least the operated amount (APS) of the accelerator;

(2) arithmetically calculating a required idle air quantity (Qia) based on at least an engine temperature (Tw) and needed to hold a stable engine idling operation;

(3) summing the driver-required air quantity (Qda) and the required idle air quantity (Qia) to generate a sum (Qda+Qia);

(4) setting the sum (Qda+Qia) as a basic target air quantity (tQaO);

(5) arithmetically calculating a target excess air factor (tλ) based on engine operating conditions;

(6) compensating for the basic target air quantity (tQaO) by at least the target excess air factor (tλ) to generate a compensated basic target air quantity; and (7) determining the compensated basic target air quantity as the target air quantity (tQa).

8. The apparatus as claimed in claim 1, wherein said throttle control device comprises:

(1) an arithmetic-calculation section which calculates a target throttle opening area (Ath) based on the virtual target air quantity (tQad) and engine speed (Ne);

(2) an arithmetic-calculation section which calculates a target throttle opening (θth) based on the target throttle opening area (Ath); and (3) outputting a controlled variable to the throttle valve, so that an actual throttle opening of the throttle valve is adjusted toward the target throttle opening (θth).

9. The apparatus as claimed in claim 1, wherein the arithmetic-calculation section, calculating the desired boost pressure (Pcm), comprises a data processing section:

(1) arithmetically calculating a desired equilibrium boost pressure based on engine load and engine speed (Ne), and determining the desired equilibrium boost pressure as a basic boost pressure (tPc); and (2) arithmetically calculating a basic-boost-pressure weighted average responsive to the basic boost pressure (tPc) with a first-order lag by using a weighted-average coefficient (Kp), and determining the basic-boost-pressure weighted average as the target boost pressure (Pcm).

10. The apparatus as claimed in claim 9, wherein the weighted-average coefficient (Kp) is different depending on information regarding which combustion mode the engine is in.

11. The apparatus as claimed in claim 9, wherein the weighted-average coefficient (Kp) is retrieved from a predetermined characteristic map showing how the weighted-average coefficient (Kp) varies relative to engine load and engine speed (Ne).

12. The apparatus as claimed in claim 9, wherein the weighted-average coefficient (Kp) is looked up from a predetermined look-up table using a product (APS×Ne) of the operated amount (APS) of the accelerator and the engine speed (Ne) as a parameter, and showing how the weighted-average coefficient (Kp) varies relative to the product (APS×Ne).

13. The apparatus as claimed in claim 10, which further comprises an arithmetic-calculation section which calculates a target excess air factor (tλ) based on engine operating conditions, and wherein the weighted-average coefficient (Kp) is retrieved from a predetermined map using a product (APS×Ne×tλ) of the operated amount (APS) of the accelerator, the engine speed (Ne) and target excess air factor (tλ) as a parameter, and showing how the weighted-average coefficient (Kp) varies relative to the product (APS×Ne×tλ).

14. The apparatus as claimed in claim 1, which further comprises an arithmetic-calculation section which calculates a target excess air factor (tλ) based on engine operating conditions, and wherein the arithmetic-calculation section, calculating the desired boost pressure (Pcm), comprises a data processing section:
 (1) arithmetically calculating a desired equilibrium boost pressure based on engine load and engine speed (Ne) in a homogeneous stoichiometric combustion mode, and determining the desired equilibrium boost pressure as a basic boost pressure (tPc);
 (2) arithmetically calculating a homogeneous-stoichiometric-combustion-mode basic-boost-pressure weighted average (Pcm3) responsive to the basic boost pressure (tPc) with a first-order lag by using a weighted-average coefficient (Kp3) for a homogeneous stoichiometric combustion mode, and determining the homogeneous-stoichiometric-combustion-mode basic-boost-pressure weighted average (Pcm3) as the target boost pressure (Pcm) used at the homogeneous stoichiometric combustion mode;
 (3) determining a product (Pcm3×tλ), obtained by multiplying the homogeneous-stoichiometric-combustion-mode basic-boost-pressure weighted average (Pcm3) by the target excess air factor (tλ) calculated during the stratified combustion mode, as the target boost pressure (Pcm) used at the stratified combustion mode; and
 (4) determining a product (Pcm3×tλ), obtained by multiplying the homogeneous-stoichiometric-combustion-mode basic-boost-pressure weighted average (Pcm3) by the target excess air factor (tλ) calculated during the homogeneous-lean combustion mode, as the target boost pressure (Pcm) used at the homogeneous-lean combustion mode.

15. The apparatus as claimed in claim 1, wherein the arithmetic-calculation section, calculating the desired boost pressure (Pcm), comprises a data processing section:
 (1) arithmetically calculating a desired equilibrium boost pressure based on engine load and engine speed (Ne), and determining the desired equilibrium boost pressure as a basic boost pressure (tPc); and
 (2) arithmetically calculating a value responsive to the basic boost pressure (tPc) with a ramp response, and determining the value as the target boost pressure (Pcm).

16. The apparatus as claimed in claim 1, which further comprises an arithmetic-calculation section which calculates a target excess air factor (tλ) based on engine operating conditions, and wherein the arithmetic-calculation section, calculating the desired boost pressure (Pcm), comprises a data processing section:
 (1) arithmetically calculating a desired equilibrium boost pressure based on engine load and engine speed (Ne) in a homogeneous stoichiometric combustion mode, and determining the desired equilibrium boost pressure as a basic boost pressure (tPc);
 (2) arithmetically calculating a homogeneous-stoichiometric-combustion-mode basic-boost-pressure weighted average (Pcm3) responsive to the basic boost pressure (tPc) with a first-order lag by using a weighted-average coefficient (Kp3) for a homogeneous stoichiometric combustion mode;
 (3) arithmetically calculating a product (Pcm3×tλ×K) of the homogeneous-stoichiometric-combustion-mode basic-boost-pressure weighted average (Pcm3), the target excess air factor (tλ) and a matching constant (K), and determining the product (Pcm3×tλ×K) as the target boost pressure (Pcm).

17. In a computed-controlled internal combustion engine with a supercharging device operable to produce a desired boost pressure, an electronic engine control system for compensating for a response delay in boost-pressure change, comprising:
 a throttle control means for controlling a throttle valve;
 a pressure sensing means located in an induction system for detecting an actual boost pressure;
 a control unit being configured to be connected to the throttle control means for arbitrarily controlling a throttle opening of the throttle valve depending on an operated amount of an accelerator; said control unit comprising
  (a) an arithmetic-calculation means for calculating a target air quantity used in an engine operating region of a lean air/fuel ratio, based on at least the operated amount of the accelerator,
  (b) an arithmetic-calculation means for calculating the desired boost pressure based on engine speed and engine load,
  (c) an arithmetic-calculation means for calculating a boost-pressure correction factor responsively to a difference between the desired boost pressure and the actual boost pressure, in the engine operating region of the lean air/fuel ratio, and
  (d) an arithmetic-calculation means for compensating for the target air quantity used in the engine operating region of the lean air/fuel ratio by the boost-pressure correction factor to generate a compensated target air quantity, and for determining the compensated target air quantity as a virtual target air quantity; and
 a throttle actuating means for driving the throttle valve, so that the virtual target air quantity is drawn into the engine.

18. In a computed-controlled internal combustion engine with a supercharging device operable to produce a desired boost pressure, an electronic engine control system for compensating for a response delay in boost-pressure change, comprising:
 a throttle control means for controlling a throttle valve;
 a pressure sensing means located in an induction system for detecting an actual boost pressure;
 a control unit being configured to be connected to the throttle controlling means for arbitrarily controlling a throttle opening of the throttle valve depending on an operated amount of an accelerator; said control unit comprising
- (a) an arithmetic-calculation means for calculating a target air quantity based on at least the operated amount of the accelerator,
- (b) an arithmetic-calculation means for calculating the desired boost pressure based on engine speed and engine load,
- (c) an arithmetic-calculation means for calculating a boost-pressure correction factor responsively to a difference between the desired boost pressure and the actual boost pressure, and
- (d) a determination means for determining whether the engine is in an operating region of a lean air/fuel ratio or in an operating region of a stoichiometric air/fuel ratio, and
- (e) an arithmetic-and-logic means being responsive to a result determined by the determination section, for compensating for the target air quantity by the boost-pressure correction factor to generate a compensated target air quantity and determining the compensated target air quantity as a virtual target air quantity when the engine is in the operating region of the lean air/fuel ratio, and for determining the target air quantity itself as the virtual target air quantity when the engine is in the operating region of the stoichiometric air/fuel ratio; and a throttle actuating means for driving the throttle valve, so that the virtual target air quantity is drawn into the engine.

19. A method for compensating for a response delay in boost-pressure change in a computed-controlled internal combustion engine having a supercharging device operable to produce a desired boost pressure and a throttle valve whose throttle opening is arbitrarily controlled depending on an operated amount of an accelerator, the method comprising:

detecting an actual boost pressure;

calculating a target air quantity used in an engine operating region of a lean air/fuel ratio, based on at least the operated amount of the accelerator;

calculating the desired boost pressure based on engine speed and engine load;

calculating a boost-pressure correction factor as a ratio of the desired boost pressure to the actual boost pressure, in the engine operating region of the lean air/fuel ratio;

compensating for the target air quantity used in the engine operating region of the lean air/fuel ratio by the boost-pressure correction factor to generate a compensated target air quantity;

determining the compensated target air quantity as a virtual target air quantity; and driving the throttle valve, so that the virtual target air quantity is drawn into the engine.

20. A method for compensating for a response delay in boost-pressure change in a computed-controlled internal combustion engine having a supercharging device operable to produce a desired boost pressure and a throttle valve whose throttle opening is arbitrarily controlled depending on an operated amount of an accelerator, the method comprising:

detecting an actual boost pressure;

calculating a target air quantity based on at least the operated amount of the accelerator;

calculating the desired boost pressure based on engine speed and engine load;

calculating a boost-pressure correction factor as a ratio of the desired boost pressure to the actual boost pressure;

determining whether the engine is in an operating region of a lean air/fuel ratio or in an operating region of a stoichiometric air/fuel ratio;

compensating for the target air quantity by the boost-pressure correction factor to generate a compensated target air quantity;

determining the compensated target air quantity as a virtual target air quantity when the engine is in the operating region of the lean air/fuel ratio, and determining the target air quantity itself as the virtual target air quantity when the engine is in the operating region of the stoichiometric air/fuel ratio; and driving the throttle valve, so that the virtual target air quantity is drawn Into the engine.

21. An apparatus for controlling an internal combustion engine with a supercharging device operable to produce a desired boost pressure, comprising:

a throttle control device which controls an electronically-controlled throttle valve;

a pressure sensor located in an induction system to detect an actual boost pressure;

a control unit being configured to be electronically connected to the throttle control device for arbitrarily controlling a throttle opening of the electronically-controlled throttle valve depending on an operated amount of an accelerator; said control unit comprising
- (a) an arithmetic-calculation section which calculates a target air quantity used in an engine operating region of a lean air/fuel ratio, based on at least the operated amount of the accelerator,
- (b) an arithmetic-calculation section which calculates the desired boost pressure based on engine speed and engine load,
- (c) an arithmetic-calculation section which calculates a boost-pressure correction factor responsively to a difference between the desired boost pressure and the actual boost pressure, in the engine operating region of the lean air/fuel ratio, and
- (d) an arithmetic-calculation section which compensates for the target air quantity used in the engine operating region of the lean air/fuel ratio by the boost-pressure correction factor to generate a compensated target air quantity, and determines the compensated target air quantity as a virtual target air quantity; and a throttle actuator device which drives the electronically-controlled throttle, so that the virtual target air quantity is drawn into the engine.

* * * * *